(12) United States Patent
Ishizaka et al.

(10) Patent No.: US 7,528,984 B2
(45) Date of Patent: May 5, 2009

(54) PRINTING APPARATUS, DATA PROCESSING METHOD FOR PRINTING APPARATUS, AND PRINTING SYSTEM

(75) Inventors: Nobuhiro Ishizaka, Kanagawa-ken (JP); Souhei Tanaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 11/679,288

(22) Filed: Feb. 27, 2007

(65) Prior Publication Data
US 2007/0139665 A1 Jun. 21, 2007

Related U.S. Application Data

(62) Division of application No. 11/000,236, filed on Dec. 1, 2004, now Pat. No. 7,198,418.

(30) Foreign Application Priority Data

Dec. 11, 2003 (JP) ............................. 2003-413815
Nov. 26, 2004 (JP) ............................. 2004-341685

(51) Int. Cl.
G06K 15/00 (2006.01)
G06K 15/10 (2006.01)
G06F 3/12 (2006.01)
B41J 2/195 (2006.01)
B41J 29/38 (2006.01)
G06K 15/22 (2006.01)
B41J 11/20 (2006.01)
B41J 5/30 (2006.01)

(52) U.S. Cl. .................... 358/1.16; 358/1.4; 358/1.8; 358/1.15; 358/1.17; 347/7; 347/9; 400/60; 400/61; 400/62

(58) Field of Classification Search ............ 358/1.4, 358/1.8, 1.15, 1.16, 1.17; 347/7, 9; 400/60, 400/61, 62
See application file for complete search history.

(56) References Cited

U.S. PATENT DOCUMENTS 4,723,129 A  2/1988 Endo et al. ................ 346/1.1

(Continued)

FOREIGN PATENT DOCUMENTS

JP  2003-305895  10/2003

(Continued)

Primary Examiner—Twyler L Haskins
Assistant Examiner—Fred Guillermety
(74) Attorney, Agent, or Firm—Fitzpatrick, Cella, Harper & Scinto

(57) ABSTRACT

In a printing apparatus including a reception buffer which stores setting data and printing data of printing element arrays transmitted from a connected host device, and a printing buffer which stores the printing data of the printing element arrays in association with printing positions in a scanning direction, the printing data are controlled to be stored in the printing buffer by adjusting the storage positions of the printing data of the printing element arrays on the basis of registration information which is contained in the setting data and corresponds to the relative distance between the printing element arrays in the scanning direction. Read address information for reading out the printing data stored in the printing buffer is controlled for each printing element array. Printing is performed by driving each printing element array in accordance with the printing data read out on the basis of the read address information. The printing apparatus executes a registration adjustment process associated with the relative distance between the printing element arrays that has conventionally been done in a host device, simplifying a printing data generation process by the host device.

5 Claims, 23 Drawing Sheets

U.S. PATENT DOCUMENTS

| | | | |
|---|---|---|---|
| 4,740,796 A | 4/1988 | Endo et al. | 346/1.1 |
| 5,250,956 A | 10/1993 | Haselby et al. | 347/19 |
| 5,907,666 A * | 5/1999 | Yano et al. | 358/1.9 |
| 6,960,036 B1 | 11/2005 | Fujita et al. | 400/124.11 |
| 2003/0193535 A1 * | 10/2003 | Nakayama et al. | 347/5 |
| 2003/0193536 A1 | 10/2003 | Kuronuma et al. | 347/9 |
| 2003/0193691 A1 | 10/2003 | Tanaka et al. | 358/1.16 |

FOREIGN PATENT DOCUMENTS

JP     2003-305896     10/2003

* cited by examiner

FIG. 4

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA | SECOND COLOR DATA | SECOND COLOR DATA | SECOND COLOR DATA |
| THIRD COLOR DATA | THIRD COLOR DATA | THIRD COLOR DATA | THIRD COLOR DATA | THIRD COLOR DATA | THIRD COLOR DATA | THIRD COLOR DATA | THIRD COLOR DATA |
| FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA |
| FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA |
| SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA |
| SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA |
| EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA |

FIG. 7A

| FIRST BLOCK | SECOND BLOCK | THIRD BLOCK | FOURTH BLOCK / FIFTH BLOCK | SIXTH BLOCK | SEVENTH BLOCK / EIGHTH BLOCK |
|---|---|---|---|---|---|
| FIRST COLOR DATA | FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA | SECOND COLOR DATA |
| THIRD COLOR DATA | FIFTH COLOR DATA | /// | THIRD COLOR DATA | THIRD COLOR DATA | THIRD COLOR DATA |
| FOURTH COLOR DATA | SIXTH COLOR DATA | /// | FOURTH COLOR DATA | FOURTH COLOR DATA | FOURTH COLOR DATA |
| FIFTH COLOR DATA | SEVENTH COLOR DATA | /// | FIFTH COLOR DATA | FIFTH COLOR DATA | FIFTH COLOR DATA |
| SIXTH COLOR DATA | EIGHTH COLOR DATA | /// | SIXTH COLOR DATA | SIXTH COLOR DATA | SIXTH COLOR DATA |
| SEVENTH COLOR DATA | /// | /// | SEVENTH COLOR DATA | SEVENTH COLOR DATA | SEVENTH COLOR DATA |
| EIGHTH COLOR DATA | /// | /// | EIGHTH COLOR DATA | EIGHTH COLOR DATA | EIGHTH COLOR DATA |

FIG. 7B

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | | |
| SECOND COLOR DATA | SECOND COLOR DATA | SECOND COLOR DATA | SECOND COLOR DATA | SECOND COLOR DATA | SECOND COLOR DATA | | |
| THIRD COLOR DATA | FIFTH COLOR DATA | THIRD COLOR DATA | /// | THIRD COLOR DATA | THIRD COLOR DATA | | |
| FOURTH COLOR DATA | SIXTH COLOR DATA | FOURTH COLOR DATA | /// | FOURTH COLOR DATA | FOURTH COLOR DATA | | |
| FIFTH COLOR DATA | SEVENTH COLOR DATA | FIFTH COLOR DATA | /// | FIFTH COLOR DATA | FIFTH COLOR DATA | | |
| SIXTH COLOR DATA | EIGHTH COLOR DATA | SIXTH COLOR DATA | /// | SIXTH COLOR DATA | SIXTH COLOR DATA | | |
| SEVENTH COLOR DATA | /// | SEVENTH COLOR DATA | /// | SEVENTH COLOR DATA | SEVENTH COLOR DATA | | |
| EIGHTH COLOR DATA | /// | EIGHTH COLOR DATA | /// | EIGHTH COLOR DATA | EIGHTH COLOR DATA | | |

FIG. 10

ADDRESS UPDATE METHOD IN REGISTRATION ADJUSTMENT [HEIGHT: 3, WIDTH: 16]
(FIRST COLOR: REGISTRATION WIDTH = 6, SECOND COLOR: REGISTRATION WIDTH = 2)
(ACTUAL ADDRESS FOR STORING DATA)

16bit × 1bit

| | | | | | | | | | | | | | | | |
|---|---|---|---|---|---|---|---|---|---|---|---|---|---|---|---|
| 0 | 6 | C | 12 | 18 | 1E | 24 | 2A | 30 | 36 | 3C | 42 | 48 | 4E | 54 | 5A |
| 2 | 8 | E | 14 | 1A | 20 | 26 | 2C | 32 | 38 | 3E | 44 | 4A | 50 | 56 | 5C |
| 4 | A | 10 | 16 | 1C | 22 | 28 | 2E | 34 | 3A | 40 | 46 | 4C | 52 | 58 | 5E |
| 60 | 66 | 6C | 72 | 78 | 7E | 84 | 8A | 90 | 96 | 9C | A2 | A8 | AE | B4 | BA |
| 62 | 68 | 6E | 74 | 7A | 80 | 86 | 8C | 92 | 98 | 9E | A4 | AA | B0 | B6 | BC |
| 64 | 6A | 70 | 76 | 7C | 82 | 88 | 8E | 94 | 9A | A0 | A6 | AC | B2 | B8 | BE |
| C0 | C6 | CC | D2 | D8 | DE | | | | | | | | | | |
| C2 | C8 | CE | D4 | DA | E0 | | | | | | | | | | |
| C4 | CA | D0 | D6 | DC | E2 | | | | | | | | | | |
| 120 | 126 | | | | | | | | | | | | | | |
| 122 | 128 | | | | | | | | | | | | | | |
| 124 | 12A | | | | | | | | | | | | | | |

1 : FIRST COLOR
1 : SECOND COLOR
2 : FIRST COLOR
2 : SECOND COLOR

F I G. 12B

RECEIVED DATA : DATA NOT SUBJECTED TO REGISTRATION ADJUSTMENT

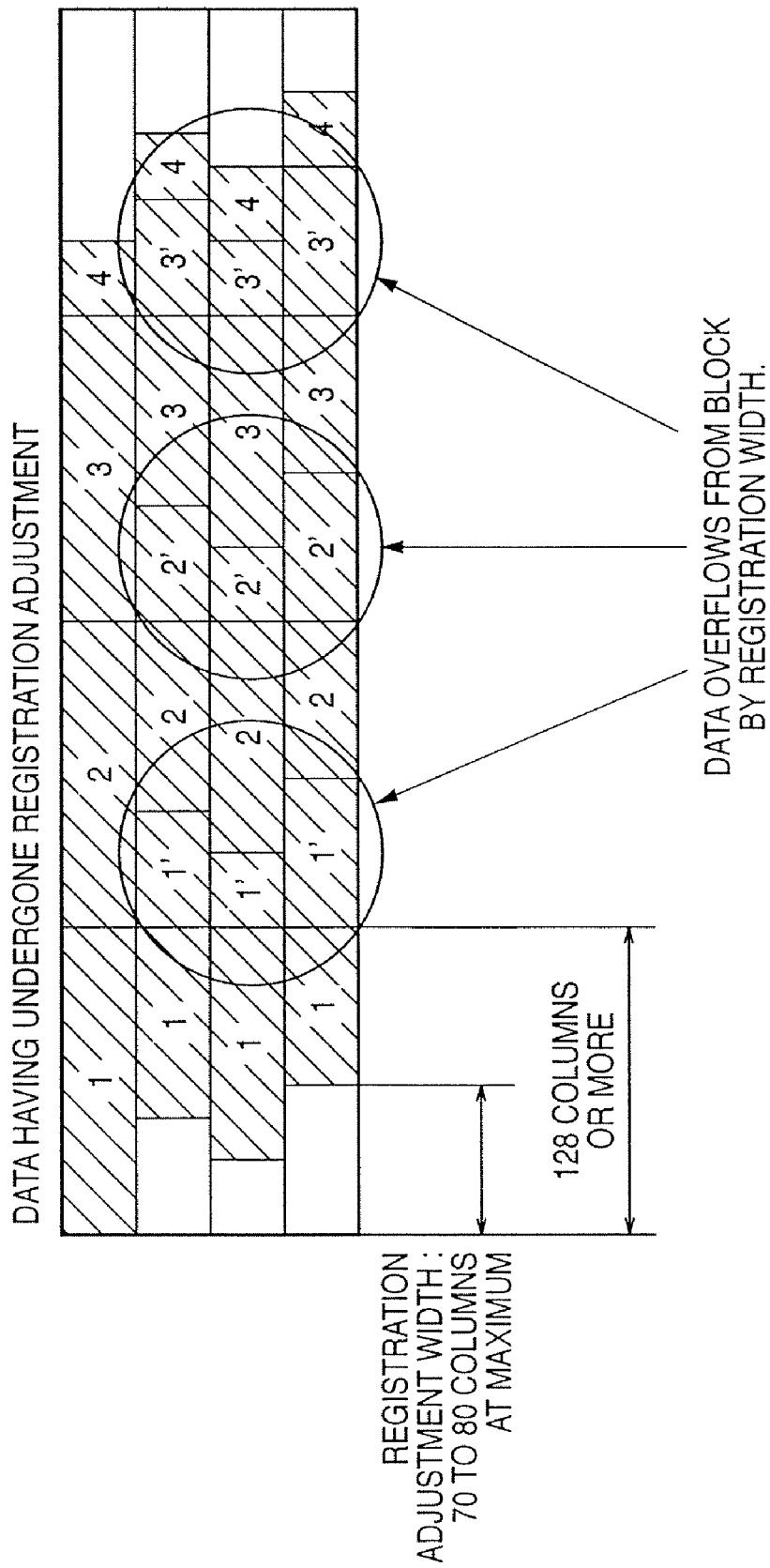

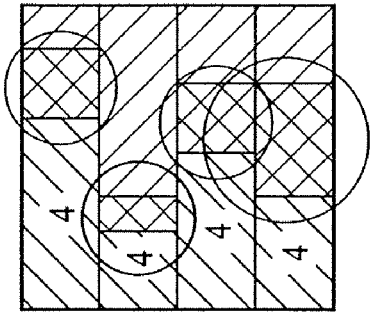
FIG. 13H POINT AT WHICH COL_CNG IS INSERTED
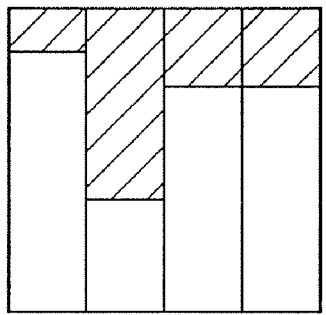
FIG. 13G REGISTRATION WIDTH USING BACK END AS REFERENCE
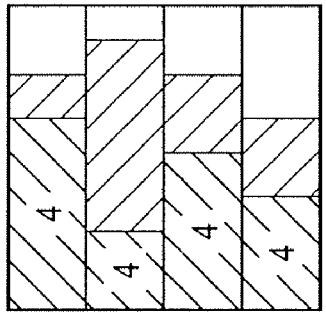
FIG. 13F DATA BEFORE COMPRESSION + REGISTRATION WIDTH
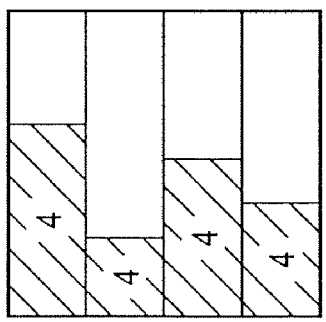
FIG. 13E DATA BEFORE COMPRESSION

PRINTING APPARATUS, DATA PROCESSING METHOD FOR PRINTING APPARATUS, AND PRINTING SYSTEM

This is a divisional of application Ser. No. 11/000,236, filed on Dec. 1, 2004.

FIELD OF THE INVENTION

The present invention relates to a printing apparatus, a data processing method for the printing apparatus, and a printing system and, more particularly, to a printing data process in a printing apparatus which prints by scanning in a direction crossing to a printing element array direction a printhead having a plurality of printing element arrays in which a plurality of printing elements are aligned in a predetermined direction.

BACKGROUND OF THE INVENTION

A printer which prints information such as a desired character or image on a sheet-like printing medium such as a paper sheet or film is widely used as an information output apparatus in a wordprocessor, personal computer, facsimile apparatus, and the like.

Various methods are known as printing methods for the printer. Especially an inkjet method has recently received a great deal of attention because this method can realize non-contact printing on a printing medium such as a paper sheet, easily prints in color, and is quiet. Because of low cost and easy downsizing, a popular inkjet arrangement is a serial printing system in which a printhead for discharging ink in accordance with desired printing information prints while reciprocally scanning in a direction crossing to the convey direction of a printing medium such as a paper sheet.

There has conventionally been known a printing apparatus which divides the printing region of a printhead in the scanning direction into a plurality of regions and has a buffer for storing printing data of each divided region, in order to print by scanning a carriage mounting the printhead on a printing medium.

The printing apparatus comprises a write controller which controls, for each color, write address information of printing data of each region on the basis of information for switching the data storage area for each color and the result of a comparison between the remaining storable buffer space and the write address update amount when printing data of each divided region is to be stored in the buffer (Japanese Patent Laid-Open No. 2003-305896).

The printing apparatus further comprises a read controller which controls, for each color, read address information for reading out printing data stored in the buffer, and a printing data generation means for generating printing data of each divided region in accordance with printing data read out on the basis of the read address information.

Printing data transferred from a host computer to the conventional printing apparatus having this arrangement undergoes positional adjustment (registration adjustment) in the scanning direction (raster direction) by the host computer (printer driver) (Japanese Patent Laid-Open No. 2003-305895).

Printing data transferred to a printing apparatus is generally expressed by 1 bit (binary) representing printing/non-printing. However, the data processing unit of a host computer is generally set to 16 or 32 bits.

It is, therefore, not efficient to process 1-bit data such as printing data by the host computer, and the process takes a long time.

The resolution of printing apparatuses has recently increased, and the printing data amount transferred from the host computer to the printing apparatus has also increased. As the printing data amount increases, generation of printing data by the host computer takes a longer time. An effective speed until the printing apparatus executes printing upon designation of printing decreases.

For this reason, it is indispensable to shorten a time taken to generate printing data to be transferred from the host computer (printer driver) to the printing apparatus and a time until printing is executed upon designation of printing.

SUMMARY OF THE INVENTION

It is an object of the present invention to provide a printing apparatus capable of speeding up a printing data generation process in a host computer.

It is another object of the present invention to provide a printing method capable of speeding up a printing data generation process in a host computer.

It is still another object of the present invention to provide a printing system capable of speeding up a printing data generation process in a host computer.

It is still another object of the present invention to provide a host apparatus which is connected to a printing apparatus capable of speeding up a printing data generation process.

According to one aspect of the present invention, the above object is attained by a printing apparatus which prints by scanning, in a direction crossing to an array direction, a printhead having a plurality of printing element arrays in which a plurality of printing elements are aligned in a predetermined direction, comprising: a reception buffer which stores setting data and printing data of the printing element arrays that are transmitted from a connected host device, the setting data containing registration information corresponding to a relative distance between the printing element arrays in a scanning direction; a printing buffer which stores the printing data of the printing element arrays in association with printing positions in the scanning direction; and write control means for controlling to adjust storage positions of the printing data of the printing element arrays and store the printing data in the printing buffer on the basis of the registration information.

The printing apparatus executes a registration adjustment process associated with the relative distance between the printing element arrays that has conventionally been done in a host device. A printing data generation process by the host device can be simplified to shorten a time until printing is actually done upon designation of printing.

The apparatus may further comprise read control means for controlling, for each printing element array, read address information for reading out the printing data stored in the printing buffer, and printing control means for printing by driving each printing element array in accordance with the printing data read out on the basis of the read address information.

The printing element arrays may be formed so as to print in different colors.

The printing buffer may divide a printing region in the scanning direction into a plurality of blocks, and store the printing data in each block, and the write control means may have a register which stores, for each printing element array, information for identifying presence/absence of data contained in the printing data, the raster number of data, and registration information of the data.

Preferably, the write control means controls address information to be stored in the printing buffer in accordance with presence/absence of printing data of each printing element array for each block.

The apparatus may perform printing by discharging ink from each printing element.

In this case, each printing element may comprise a thermal transducer for generating thermal energy to be applied to ink in order to discharge ink by using thermal energy.

According to another aspect of the present invention another object described above is attained by a data processing method for a printing apparatus which prints by scanning, in a direction crossing to an array direction, a printhead having a plurality of printing element arrays in which a plurality of printing elements are aligned in a predetermined direction, and has a reception buffer that stores setting data and printing data of the printing element arrays transmitted from a connected host device, and a printing buffer that stores the printing data of the printing element arrays in association with printing positions in a scanning direction, comprising: a write control step of controlling to adjust storage positions of the printing data of the printing element arrays and store the printing data in the printing buffer on the basis of registration information which is contained in the setting data and corresponds to a relative distance between the printing element arrays in a scanning direction; a read control step of controlling, for each printing element array, read address information for reading out the printing data stored in the printing buffer; and a printing control step of printing by driving each printing element array in accordance with the printing data read out on the basis of the read address information.

According to still another aspect of the present invention still another object described above is attained by a printing system comprising a printing apparatus which prints by scanning, in a direction crossing to an array direction, a printhead having a plurality of printing element arrays in which a plurality of printing elements are aligned in a predetermined direction, and a host device which is connected to the printing apparatus and transmits setting data and printing data to the printing apparatus, wherein the printing system controls the host device so as to transmit, as the setting data, data containing registration information corresponding to a relative distance between the printing element arrays in a scanning direction, the printing apparatus comprises a printing buffer which stores the printing data of the printing element arrays in association with printing positions in the scanning direction, and the printing system controls the printing apparatus so as to adjust storage positions of the printing data of the printing element arrays and store the printing data in the printing buffer on the basis of the registration information.

Still another object described above can also be achieved by a host apparatus having generation means for generating, for each block corresponding to each of a plurality of regions prepared by dividing in a scanning direction a scanning printing region of a printhead on a printing medium, printing data to be output to a printing apparatus which prints on the printing medium by scanning on the printing medium the printhead having a plurality of printing element arrays, and output means for outputting an instruction including the printing data, comprising: shift amount acquisition means for acquiring information on a shift amount for the printing element array of the printhead; block count acquisition means for acquiring, from the generated printing data, the number of blocks corresponding to printing data to be printed by one scanning printing in the printing apparatus; determination means for determining on the basis of the information on the shift amount whether to change the number of blocks acquired by the block count acquisition means; and change means for changing a content of the instruction when the determination means determines to change the number of blocks.

In addition, the above objects are also achieved by a computer program which causes a computer apparatus to implement the data processing method for the printing apparatus, and a printing medium which stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A and 7B are views showing examples of printing data which is written in the printing buffer and corresponds to one scanning;

FIG. 10 is a view for explaining an actual address when the registration adjustment value is not 0;

FIGS. 12A to 12C are views schematically showing a data state associated with registration adjustment;

FIGS. 13A to 13H are views showing the data structure of the final block by registration adjustment;

DETAILED DESCRIPTION OF THE PREFERRED EMBODIMENTS

Preferred embodiments of the present invention will now be described in detail in accordance with the accompanying drawings. Note that each of constitution elements described in the following embodiments is only an example, and is not intended to limit the scope of the present invention thereto.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Further, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Moreover, "nozzle" should be interpreted as any combination of a discharge opening, a channel communicating thereto and an energy-generating element used for discharging ink, without annotation.

An embodiment in which the present invention is applied to an inkjet printing apparatus (printing apparatus) will be described in detail below.

<Schematic Structure of Printing Apparatus>

Figure 1:
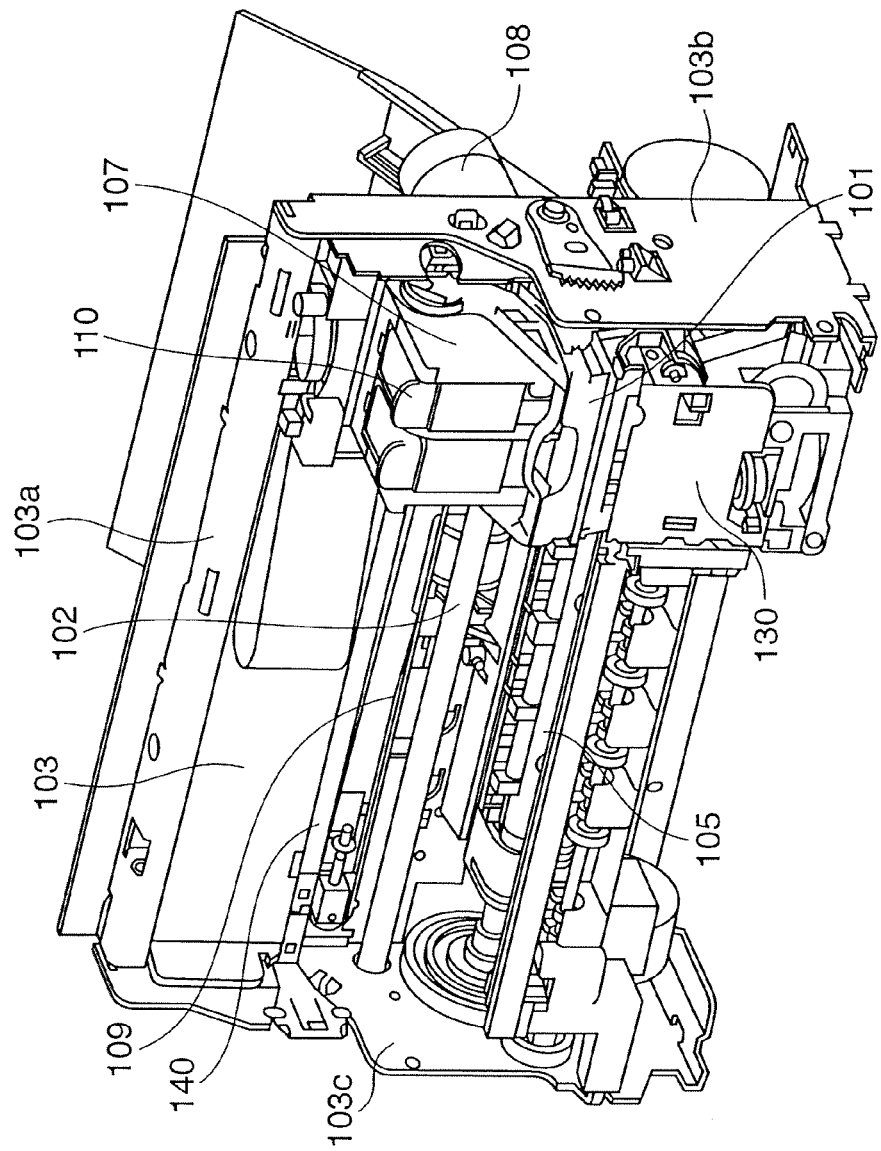
FIG. 1 is a perspective view showing an outer appearance of an inkjet printing apparatus without a cover according to the present invention.

FIG. 1 is a perspective view showing the schematic structure of an inkjet printing apparatus without a cover according to the embodiment.

In FIG. 1, a carriage 101 mounts a printhead (not shown) and cartridge 110, and can travel along a guide shaft 102. In the embodiment, the printhead is an inkjet printhead. Reference numeral 103 denotes a chassis which is formed from a main chassis 103a, and right and left side plates 103b and 103c. Reference numeral 108 denotes a carriage motor serving as a driving source for the carriage; 109, a belt which is connected to the carriage and driven by the carriage motor 108; 130, a recovery unit which cleans the printhead discharge surface and performs suction operation; and 140, a scale which forms, together with a light-emitting element and light-receiving element mounted in the carriage 101, a CR encoder for calculating a carriage position and speed.

A printing sheet serving as a printing medium is fed into the apparatus main body by a paper feed roller (not shown), pinched by a paper supply roller 105, pinch roller (not shown), and paper press plate (not shown), and conveyed to the printing region of the printhead to print.

The ink cartridge 110 includes a color ink cartridge which stores three, yellow, magenta, and cyan color inks, and a black ink cartridge which stores black ink. These two ink cartridges are separately inserted into a cartridge guide 107, and connected to the printhead.

The inkjet printing apparatus according to the embodiment is connected to a host computer, and prints upon reception of printing data from the host computer (printer driver). The printing apparatus according to the embodiment prints by scanning the carriage supporting the printhead on a printing medium. For this purpose, the printing region of the printhead in the scanning direction is divided into a plurality of regions, and an image is printed in each divided region.

In this case, according to the inkjet printing apparatus of the embodiment, the host computer does not perform positional adjustment (registration adjustment) of printing data in the scanning direction by a data process for each bit. Instead, registration adjustment of printing data is performed by a printing buffering structure control circuit 8 (FIG. 2: to be described later) in the printing apparatus. This makes it possible to speed up generation of printing data by the host computer and increase an effective printing speed.

<Arrangement of Printing Controller>

Figure 2:
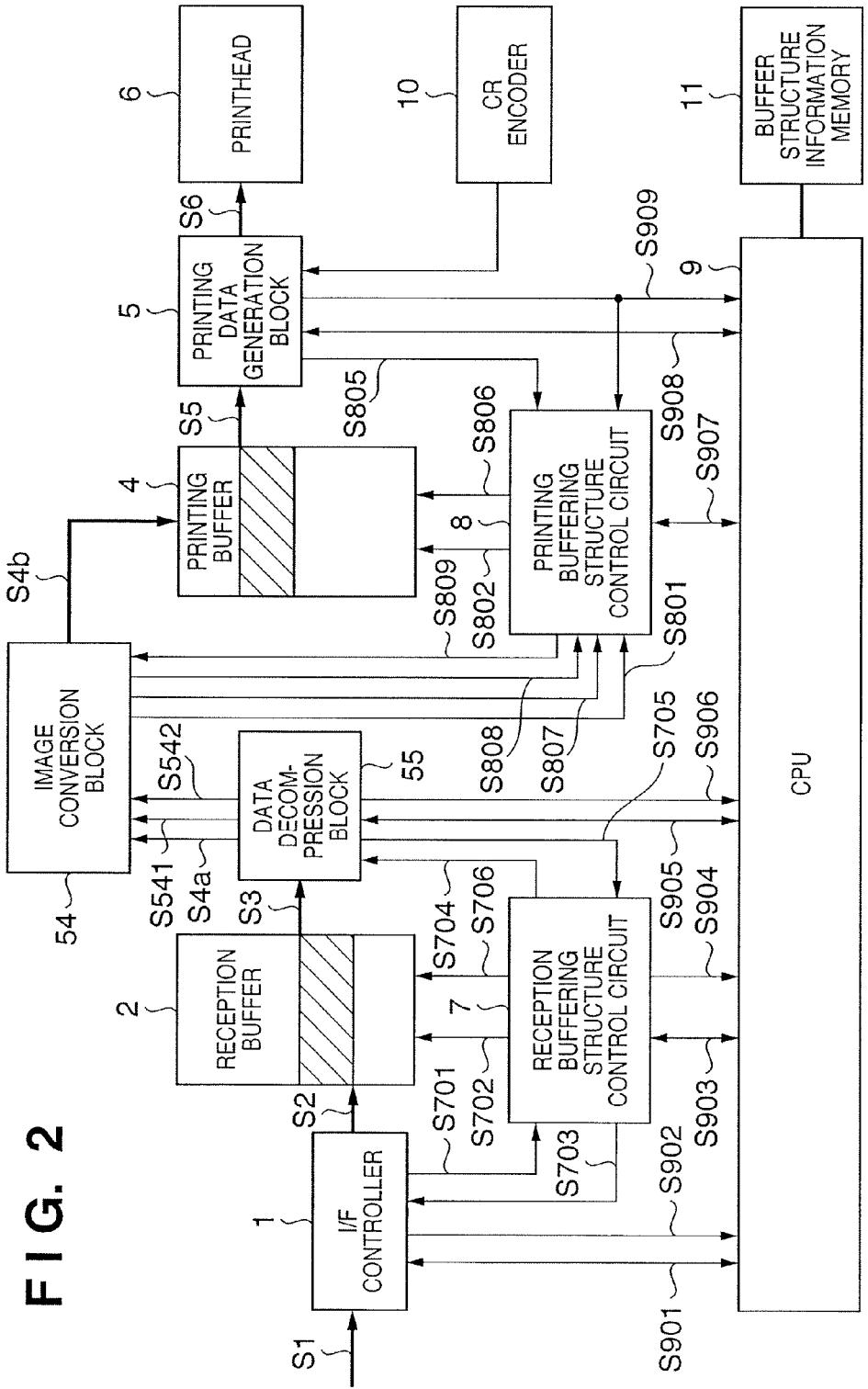
FIG. 2 is a block diagram showing an arrangement of a control circuit of the inkjet printing apparatus shown in FIG. 1.

FIG. 2 is a block diagram showing the arrangement of the printing controller according to the present invention. In FIG. 2, reference numeral 1 denotes an interface controller which receives data transferred from a host computer (not shown) via an interface signal line S1, extracts data necessary for the operation of the printing apparatus and printing data from the received data, and temporarily stores the extracted data. Data extracted by the interface controller 1 is stored in a reception buffer 2 via a signal line S2.

The reception buffer 2 is formed by a storage device (memory) such as an SRAM or DRAM, and data stored in the reception buffer has a structure as shown in FIGS. 3A to 3E.

Figure 3:
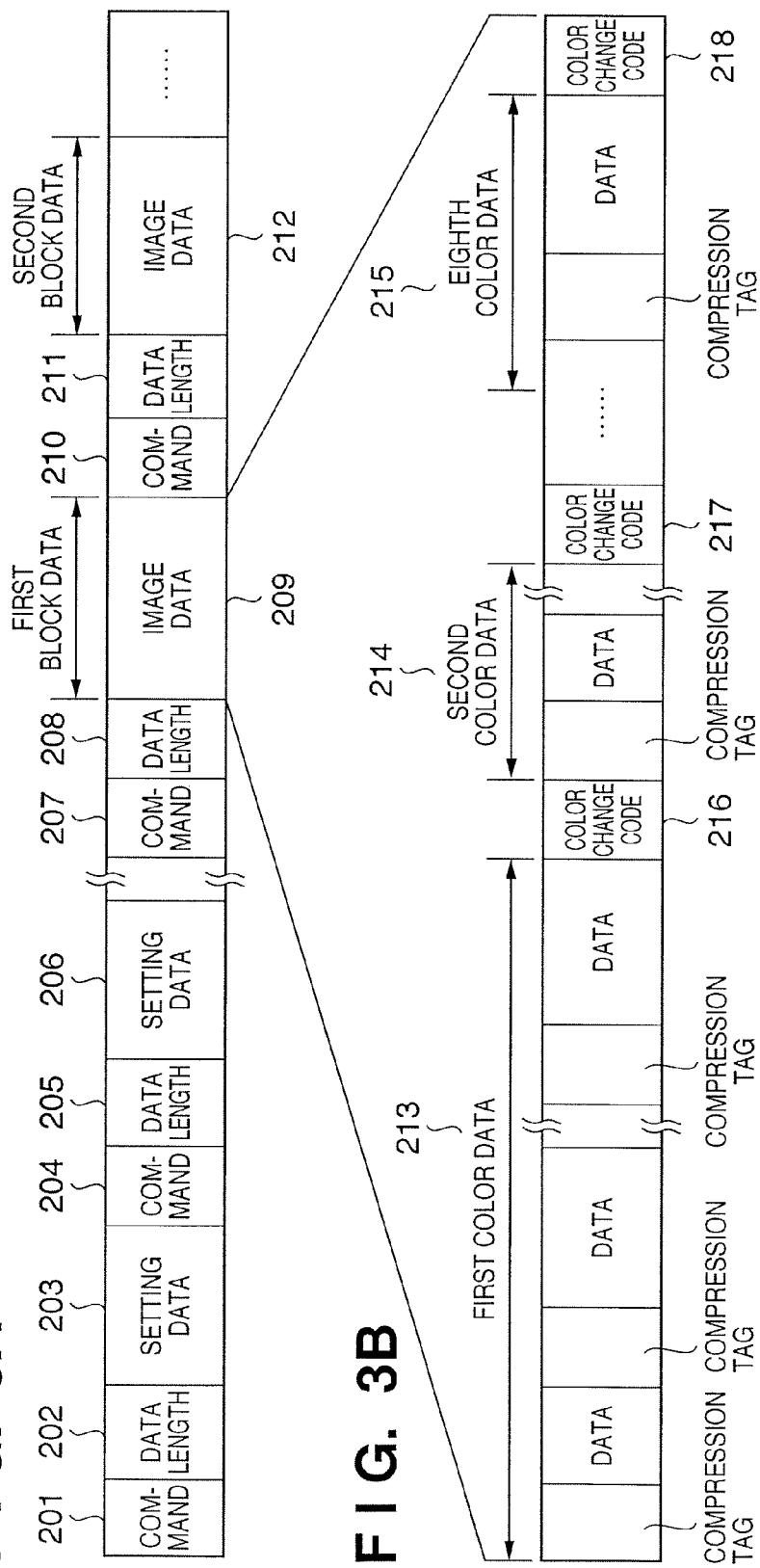
FIGS. 3A to 3E are views showing the structure of data which is transferred from a host computer and stored in a reception buffer.

As represented by the data structure of the reception buffer in FIG. 3A, "command" (201), "data length" (202), and "setting data" (203) are sequentially stored from left. Subsequently, "command" (204), "data length" (205), and "setting data" (206) are stored. This means that data transferred in time series are stored at consecutive addresses in the reception buffer. The setting data 206 is information representing execution of paper feed, setting of the paper supply amount, the number of printheads for use, and the like. The printing apparatus can print only after all pieces of information defined by the setting data are obtained. Subsequent to these data, data (209 and 212) to be printed are stored in the reception buffer 2.

The printing data (209 and 212) are data obtained by dividing a data amount necessary to print by scanning the printhead once on a printing medium into blocks each having a smaller data amount. Printing data is divided into blocks, and the divided data are sequentially stored as the first block data (209), second block data (212), . . . .

FIG. 3B is a view showing in detail the data structure of printing data divided into blocks. As shown in FIG. 3B, printing data for a plurality of colors (213 to 215) are sequentially stored as compressed data. Compression TAGs and compressed data are separated by "color change codes" (216, 217, and 218).

For example, assuming printing data of four colors, i.e., cyan, yellow, magenta, and black, a printhead having two nozzle arrays each having 64 nozzles in the longitudinal direction for each color is adopted. Since data of each nozzle array forms printing data of one color, compressed printing data for two nozzle arrays ×four colors=compressed printing data of the first to eighth colors are stored as printing data in one block data. The nozzles of each nozzle array align in the printing medium convey direction. For example, data of the first and second colors are printing data corresponding to cyan, data of the third and fourth colors are printing data corresponding to magenta, data of the fifth and sixth colors are printing data corresponding to yellow, and data of the seventh and eighth colors are printing data corresponding to black.

Figure 4:
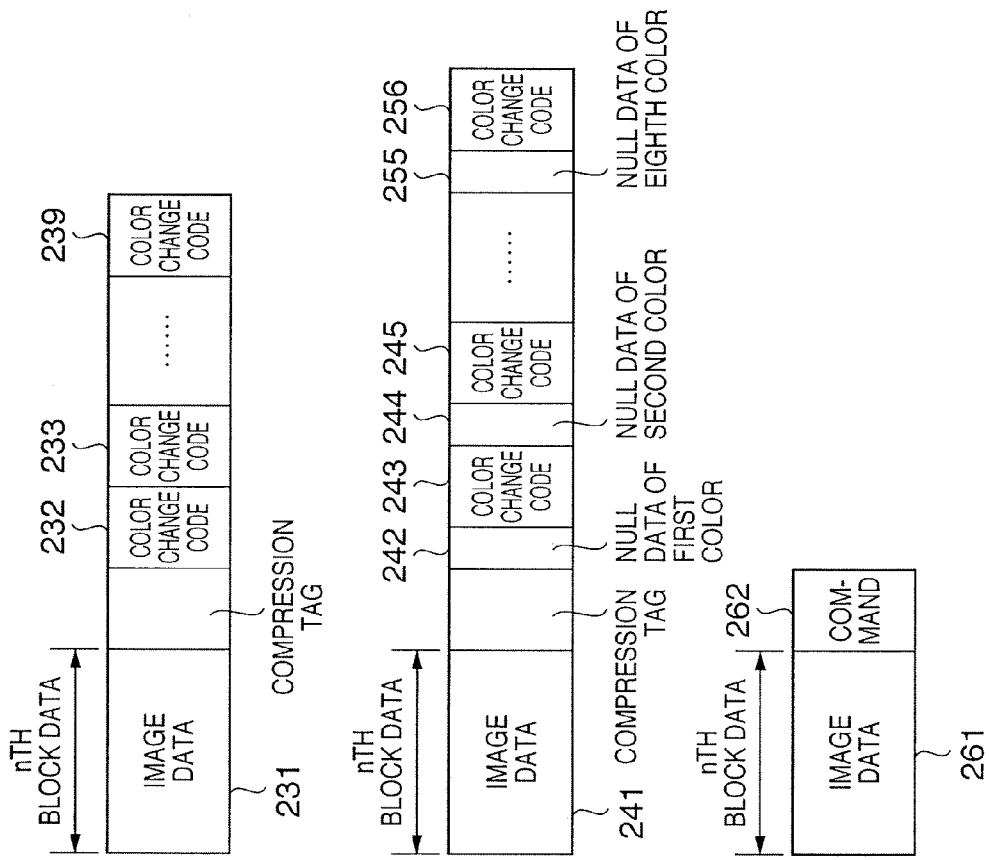
FIG. 4 is a view showing the data structure of a printing buffer which holds printing data.

FIG. 4 is a view showing the data structure of the printing buffer which holds printing data. For example, when the printing apparatus prints by a length of about eight inches at maximum in the scanning direction by one scanning and one block data corresponds to a size enough to print by about one inch in the scanning direction, an image of one scanning is completed by printing printing data of a total of eight blocks. The first to eighth blocks are arranged in the printhead scanning direction, and each block data contains printing data of a plurality of colors. The length of printing data stored in each block corresponds to the number of nozzles of the printhead.

Referring back to FIG. 2, each control block will be explained. Of data stored in the reception buffer 2, "command", "data length", and "setting data" serving as setting values for controlling the printing apparatus are read out from the interface controller 1 by a CPU 9 via a signal line S902, and set in control circuits (7 and 8) in FIG. 2 (S903 and S907). The CPU 9 interprets the readout data (data corresponding to 201 to 208 in FIG. 3A), and centralizes the overall printing control of the printing apparatus in accordance with the result. As for a printing data process, the CPU 9 activates a data decompression block 55 and causes it to execute processing.

As shown in FIG. 3B, the data decompression block 55 reads out three data "compression TAG", "data (compressed data)", and "color change code" from the reception buffer 2, and executes data rasterization control on the basis of these data. The embodiment employs PackBits compression as a data compression/decompression method. When the compression TAG takes an 8-bit value of 00h to 7Fh, data are processed on the assumption that one to 128 non-contiguous data exist in the data area. When the compression TAG takes an 8-bit value of FFh to 81h, the next 1-byte data is decompressed into two to 128 contiguous data. If 80h is read out by a data read process, data is processed as a color change code. Decompressed data is sent to an image conversion block 54 via a signal line S4a. The data undergoes HV conversion by the image conversion block, and the HV-converted data is stored in a printing buffer 4 via a signal line S4b.

The printing buffer 4 stores the decompressed printing data in the data structure shown in FIG. 4. The start data of the printing data for the first color of the first block is written at the start address of the printing buffer 4. Subsequent data are sequentially written by properly changing the address. An area capable of storing printing data for one color at the address of the printing buffer is determined by setting data first loaded by the CPU 9, and data larger than the value of the setting data cannot be written. In compressing printing data, the data size is limited in accordance with the setting data. Data after detecting a color change code are sequentially written from the start address of the printing data for the second color. Control of address data is executed by the printing buffering structure control circuit 8 (to be described later).

Write is repeated from the printing data for the first color to the printing data for the eighth color in the first block. If a color change code is detected after the end of writing the printing data for the eighth color, write of all the data of the first block is complete. The data decompression block 55 ends data rasterization operation, notifies the CPU 9 by an interrupt (S906) of the completion of rasterizing data of one block, and waits for activation of next data rasterization from the CPU 9.

When printing data of a plurality of blocks are stored in the printing buffer 4, the CPU 9 operates the carriage motor (108 in FIG. 1) in order to start printing operation. While the carriage mounting a printhead 6 scans, printing data is transferred in synchronism with a carriage encoder (CR encoder) 10 and printed to complete an image on a sheet surface (printing medium). After the printhead 6 scans in the main scanning direction, a convey means conveys the printing medium in the sub-scanning direction. Scanning of the printhead and conveyance of the printing medium are repeated to print an image of one page.

A printing data generation block 5 reads out each block structure of printing data from the printing buffer 4 via a signal line S5 at a timing synchronized with the CR encoder 10 in accordance with the value designated by the CPU 9. While the printing data generation block 5 converts the data structure into one printable by the printhead 6, the block 5 outputs the converted data structure to a signal line S6. The printing data generation block 5 holds information on the block width (representing the block length) in the printing buffer and information on the height (to be referred to as "the raster number" of printing data) of each color of the block (these pieces of information will be described later).

The readout data area of the printing buffer 4 is cleared to 0 in order to store the next printing data.

<Write/Read Control of Reception Buffer>

As described above, the interface controller 1 writes data in the reception buffer 2, and the data decompression block 55 reads out only printing data from the reception buffer 2. The write address and read address are controlled by the reception buffering structure control circuit 7. The reception buffering structure control circuit 7 manages the start address, final address, write address, and read address of the reception buffer 2.

Every time the reception buffering structure control circuit 7 receives a write request signal (S701) from the interface controller 1, the circuit 7 increments the address by one, and outputs the incremented address as write address information to the reception buffer 2 (S702). When the write address reaches the final address of the reception buffer 2, the reception buffering structure control circuit 7 performs control of returning the write address to the start address of the reception buffer 2.

When the write address reaches (coincides with) the read address, the reception buffering structure control circuit 7 notifies the interface controller 1 via a signal line S703 that the reception buffer 2 becomes full of data and no next data can be written.

At the same time, the reception buffering structure control circuit 7 also notifies the CPU 9 by an interrupt signal via a signal line S904 that no data can be written in the reception buffer 2. The structure of the reception buffer 2 can be set by writing it in an internal register by the CPU 9 using the bus of a signal line S903.

The read address is incremented by one and output to the reception buffer 2 via a signal line S706 when the CPU 9 directly reads out data from the reception buffer 2 via a data read register arranged in the reception buffering structure control circuit 7, or when the data decompression block 55 issues a request via a data read request signal line S705.

When the read address reaches the final address, the reception buffering structure control circuit 7 performs control of returning the read address to the start address of the reception buffer 2. Also when the read address reaches (coincides with) the write address, no data exists in the reception buffer, and the reception buffering structure control circuit 7 notifies the data decompression block via the signal line S704 that no next data can be read out. At the same time, the reception buffering structure control circuit 7 also notifies the CPU 9 by the interrupt signal line of the signal line S904 that no data to be read out exists in the reception buffer 2.

The process contents of data write/read control to the reception buffer 2 have been described. Process contents for writing, in the printing buffer, data which is read out from the reception buffer 2 and rasterized, or reading out data from the printing buffer will be explained.

<Write/Read Control of Printing Buffer>

The image conversion block 54 writes printing data in the printing buffer 4, and the printing data generation block 5 reads out the written printing data. At this time, the write address and read address are controlled by the printing buffering structure control circuit 8.

The printing buffering structure control circuit 8 manages the start address, final address, write address, and read address of the printing buffer.

Every time the printing buffering structure control circuit 8 receives a write request signal (S801) from the image conversion block 54, the circuit 8 properly changes the address, and outputs the incremented address as write address information to the printing buffer 4 (S802). When the write address reaches the final address of the printing buffer 4, the printing buffering structure control circuit 8 performs control of returning the write address to the start address of the printing buffer 4.

When the write address reaches (coincides with) the read address, the printing buffering structure control circuit 8 notifies the image conversion block 54 via a signal line S809 that the printing buffer 4 becomes full of printing data and no next printing data can be written.

When the data decompression block 55 loads a color change code from the reception buffer 2, the data decompression block 55 notifies the image conversion block 54 of a message to this effect via a signal line S541. The image conversion block outputs data to the printing buffering structure control circuit via a signal line S807. The printing buffering structure control circuit 8 prepares to output from a signal line S802 the start address at which the printing data for the next color is to be stored. The structure of the printing buffer 4 can be set by writing it in an internal register by the CPU 9 using the bus of the signal line S907.

The read address is incremented by one and output to the printing buffer 4 via a signal line S806 when the printing data generation block 5 issues a request via a data read request signal line S805 for each color.

When the read address reaches the final address, the printing buffering structure control circuit 8 performs control of returning the read address to the start address of the printing buffer 4.

The printing data generation block 5 sets the data structure of a currently read printing data block in the internal register of the printing data generation block 5 from the CPU 9 via the bus of a signal line S908. After all printing data in the set printing data block structure are read out, the printing data generation block 5 outputs an end signal S909 as an interrupt signal to the CPU 9. At this time, if the next printing data block has already been rasterized in the printing buffer 4, the printing data block structure is written in the register.

The printing buffer 4 controls data write for each printing data block, and does not activate the printing data generation block for an unwritten printing data block. For this reason, the read address of the printing buffer does not exceed the write address. Reference numeral 11 denotes a buffer structure information memory which is a work memory (work RAM) for controlling the printing buffer, and is an area for temporarily storing information on the printing buffer structure (to be described later).

<Description of Printing Buffering Structure Control Circuit>

Figure 5:
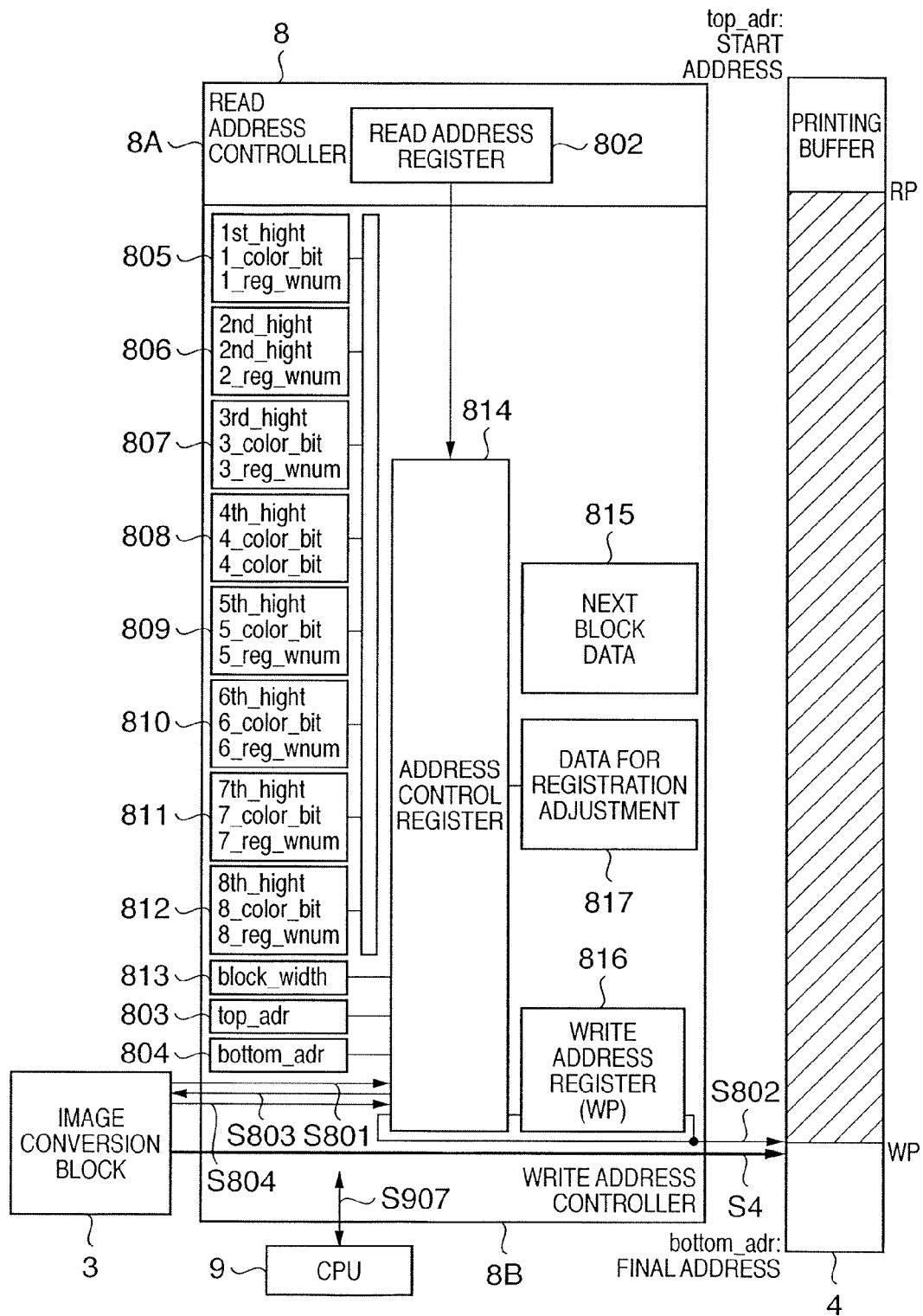
FIG. 5 is a view for explaining write address control of a printing buffering structure control circuit.
Figure 8:
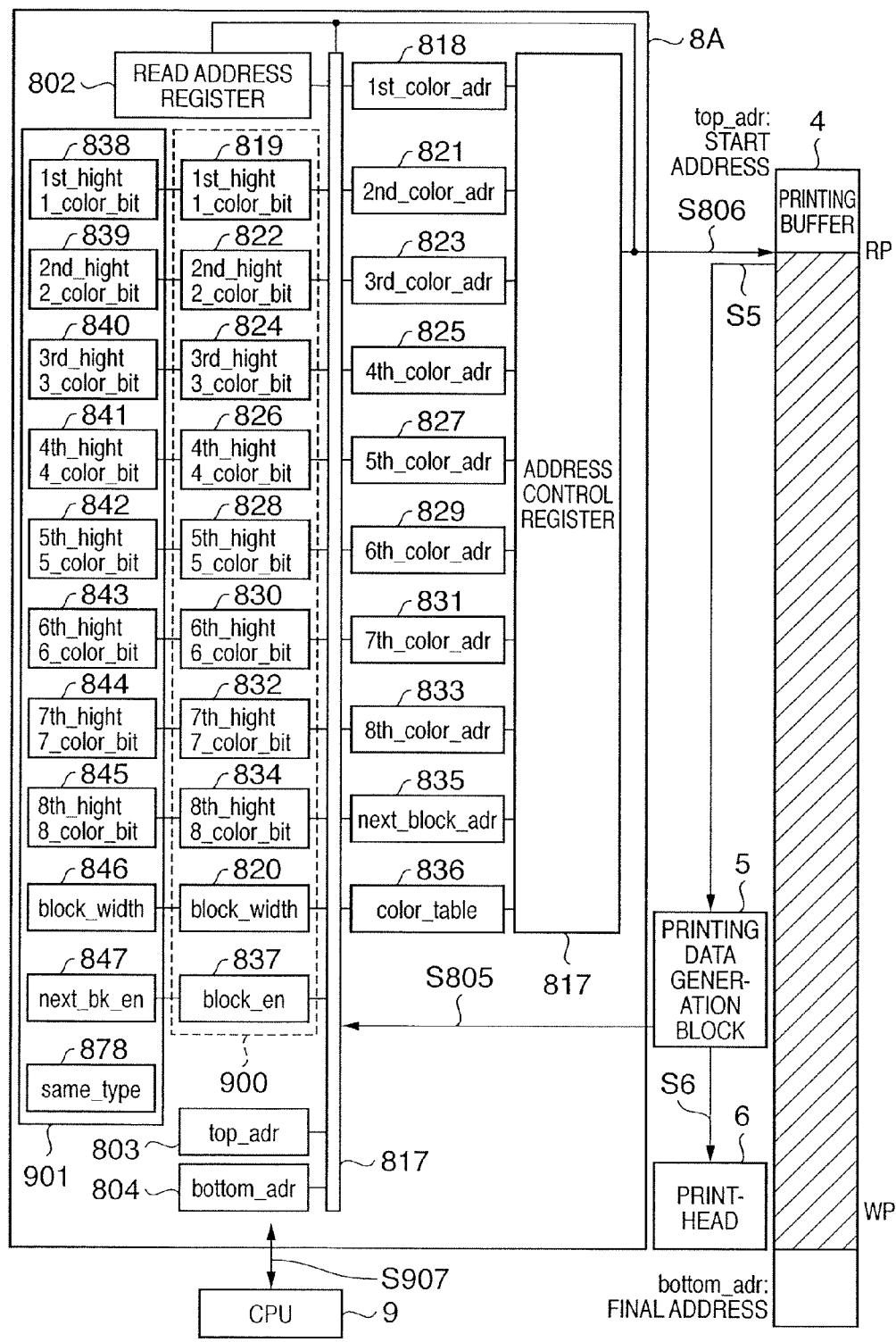
FIG. 8 is a view for explaining a process of reading out data from the printing buffer by the printing buffering structure control circuit.

The printing buffering structure control circuit will be described with reference to FIGS. 5 and 8. Among processes by the printing buffering structure control circuit, FIG. 5 is a view for mainly explaining write address control, and FIG. 8 is a view for mainly explaining read address control by the printing buffering structure control circuit 8.

The printing buffering structure control circuit 8 is comprised of a read controller 8A and write address controller 8B.

The buffer area of the printing buffer 4 is defined by a start address top_adr and final address bottom_adr of the printing buffer. The start address is stored in an internal register 803 of the write address controller 8B, and the final address is stored in an internal register 804 of the write address controller 8B. "RP" in the printing buffer 4 represents a read pointer, and "WP" represents a write pointer. The hatched portion between the RP and the WP in the printing buffer means that printing data is stored. A blank portion in the printing buffer 4 means that no printing data is stored.

Reference numeral 802 in the read address controller 8A denotes a register representing a data read address (RP: Read Pointer). Reference numerals 805 to 812 denote registers which store pieces of color information of the first to eighth colors. The register 805 stores height information (1st_hight) of the buffer for the printing data for the first color, information (1_color_bit) representing the presence/absence of the printing data for the first color, and registration adjustment value information (1_reg_wnum) of the first color. Pieces of similar information are set in the registers 806 to 812 for the second to eighth colors.

The registration adjustment value information is a value corresponding to the relative position between nozzle arrays in the raster direction, and always takes the same value for one nozzle array. That is, each nozzle array has one registration adjustment value information. For example, letting the first nozzle array be a reference, registration adjustment value information for the printing data for the first color is 0. If the distance between the second and first nozzle arrays is A columns, registration adjustment value information for the printing data for the second color is A. If the distance between the third and first nozzle arrays is B columns, registration adjustment value information for the printing data for the third color is B. In this manner, pieces of registration adjustment value information for the printing data for the second to eighth color are set in correspondence with relative distances to nozzle arrays from the reference defined by the position of the first nozzle array for printing data for the first color.

Reference numeral 813 denotes a register which sets block width information (block_width). The width information is a value commonly used for each block from the first to eighth colors.

The height information, width information, and registration adjustment value information of the block are contained in the setting data shown in FIG. 3A.

Reference numeral 815 denotes a register which stores the address of the next block data. This address can be determined using the value of any one of the registers 805 to 812 which store pieces of information on the respective colors, and the value of the register 813 which stores width information on block data. The write controller 8B determines the write start address of the second block data to be written next in accordance with setting information on the first block data to be written, and stores the determined address in the register 815.

Reference numeral 817 denotes a register which stores a write start address for registration adjustment. This address can be determined using the values of all the registers 805 to 812 which store pieces of information on the respective colors, and the value of the register 813 which stores width information on block data. The write controller 8B determines a write start address subjected to the next write for registration adjustment in accordance with setting information on the first block data to be written, and stores the determined address in the register 817.

For example, the printing data for the first color will be described. The write controller 8B determines write start address information in the second block that reflects the registration adjustment width of the first block data before the completion of writing printing data corresponding to the first block data. This also applies to the remaining printing data (for second to eighth colors).

Before the completion of writing printing data corresponding to the first block data, the write controller 8B can update write address information corresponding to the registration width of the first block data to a determined write start address.

Reference numeral 816 denotes a register which stores the write address (WP) of data.

Reference numeral 814 denotes an address control register which manages write and read so as to prevent the write address (WP) from exceeding the read address (RP) (prevent the two addresses from designating the same address).

<Storage of Data in Printing Buffer (FIGS. 6A to 6D)>

Figure 6A:
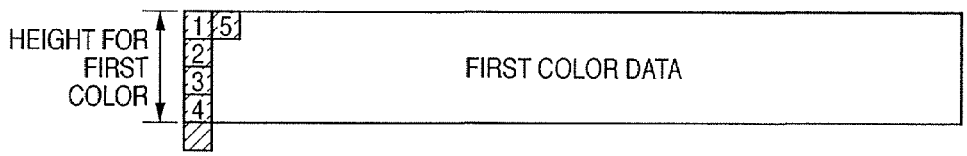
FIGS. 6A to 6D are views for explaining how to store printing data in the printing buffer.

FIGS. 6A to 6D are views for explaining how to store printing data in the printing buffer 4. FIG. 6A shows a state in which four words are sequentially stored in the vertical direction as the printing data for the first color. In this case, one word corresponds to 16 pixels. Assuming that the address at which information is stored in the register is incremented one by one, the write pointer (WP) is counted from 1→2→3→4→5→ . . . .

For example, settings for the register in FIG. 6A are a value (1st_hight) "4" of buffer height information (raster number), and a value "1 (presence)" of data presence/absence information (1_color_bit). The value of the register 813 (block width information: block_width) is "28".

Figure 6B:
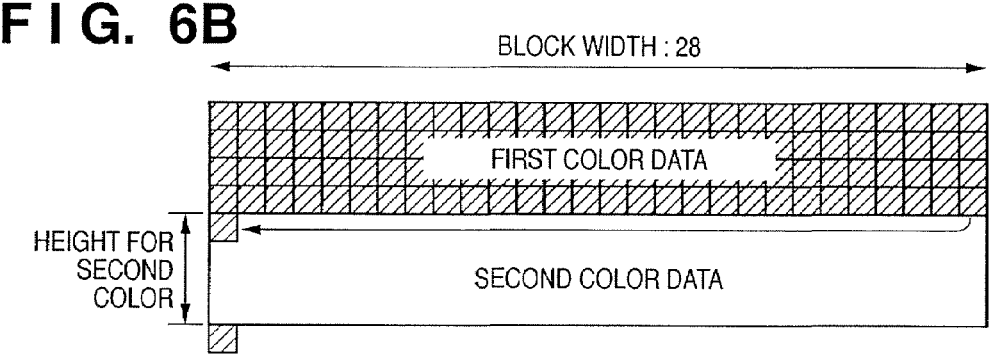
Figure 6C:
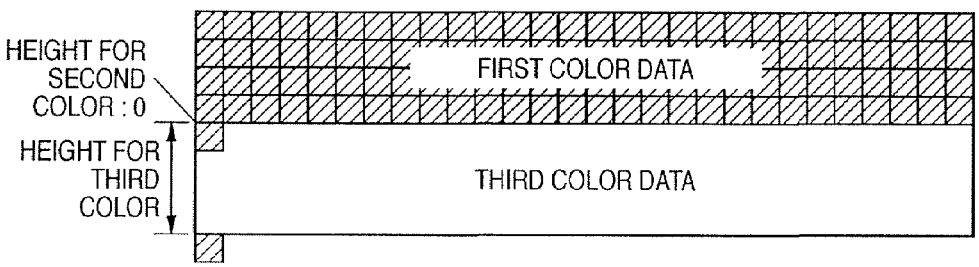

FIG. 6B is a view showing write of data in the printing buffer 4 when the printing data for the second color exists. After all printing data are stored in the storage area of the first color, the write pointer (WP) is moved to the start address of the second color, as indicated by an arrow, and printing data for the second color is stored. FIG. 6C shows a case in which no printing data for the second color exists and the printing data for the third color is stored subsequently to the storage area of the printing data for the first color. In this case, presence/absence information (2_color_bit) of the printing data for the second color in the register 806 shown in FIG. 5 is "0 (absence)" representing the absence of data. Alternatively, buffer height information (2nd_hight) "0" representing the absence of data may be used. Alternatively, the presence/absence of data may be determined using the result of AND calculation (AND process) between data presence/absence information and buffer height information.

Figure 6D:
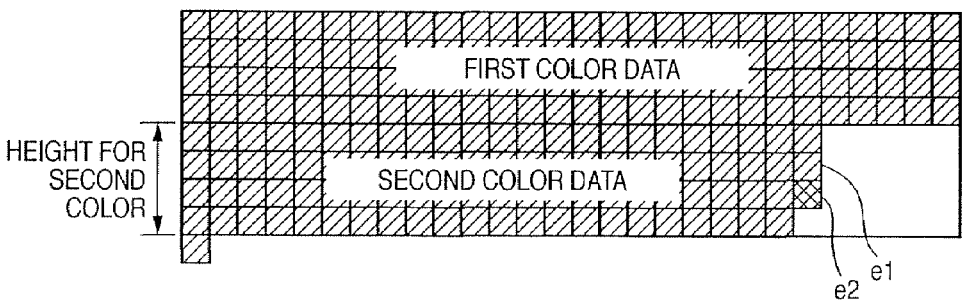

FIG. 6D shows a case in which a write position e1 (WP: Write Pointer) stops write before a read position e2 (RP: Read Pointer) for the printing data for the second color. That is, data write is inhibited at a position at which read has not ended, preventing overwrite. This control also applies to the areas of the third to eighth colors.

<Storage Process of Data in Printing Buffer>

Figure 9:
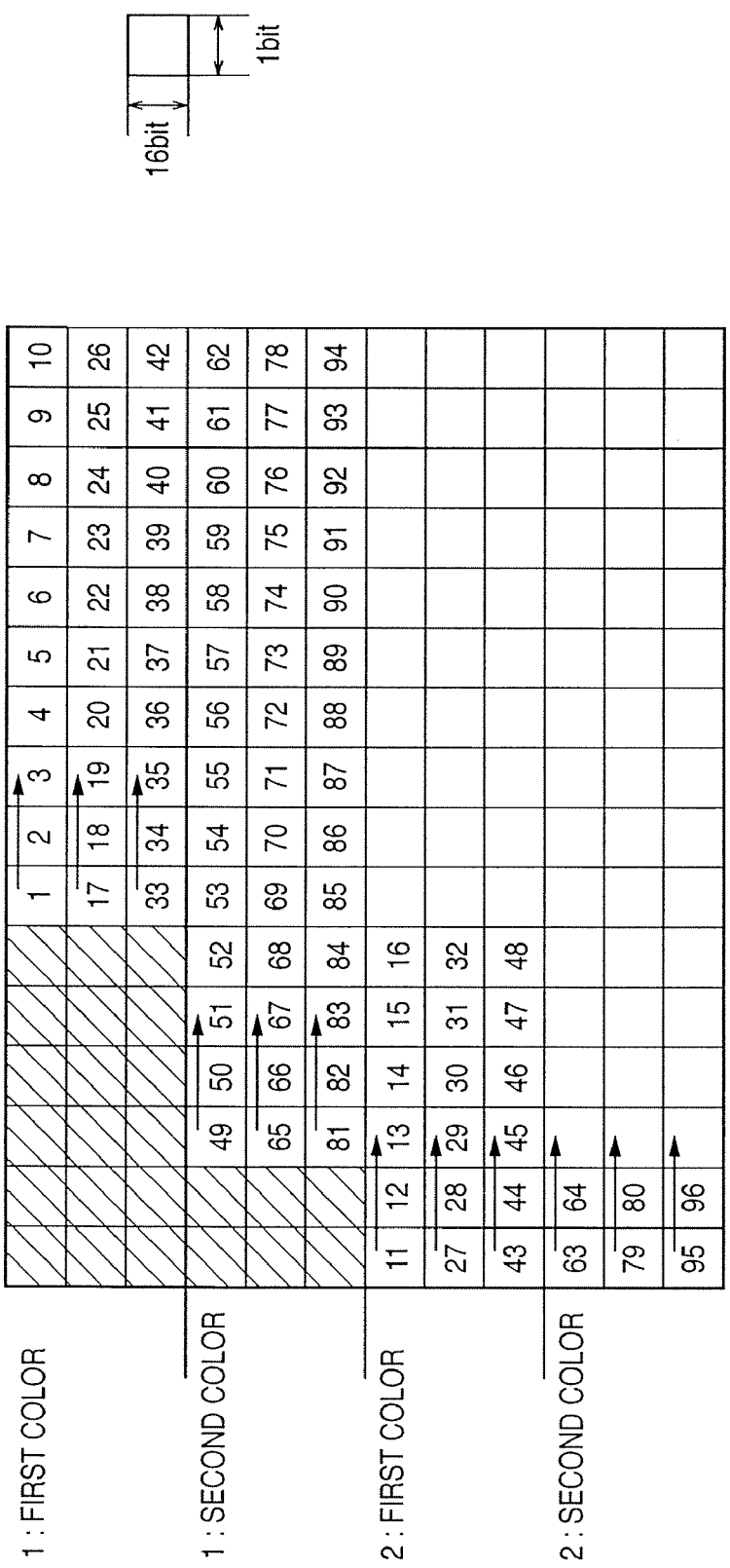
FIG. 9 is a view for explaining a data write order when the registration adjustment value is not 0.

FIGS. 9 and 10 are views showing how to store printing data in the printing buffer 4 when the registration adjustment value is not 0. In FIGS. 9 and 10, three words are sequentially stored in the vertical direction as the printing data for the first color. In this case, one word corresponds to 16 pixels.

FIG. 9 is a view showing a data input order, and FIG. 10 is a view showing an address at which data is actually written.

Hatched portions in FIGS. 9 and 10 represent the registration adjustment value (6) of the first color. An actual write start position is located at a position shown in FIG. 9, but as shown in FIG. 10, an actual address starts from a position (e.g., seventh position "24" from left) obtained by skipping addresses in correspondence with the registration adjustment value.

Since FIGS. 9 and 10 correspond to each other, the address of data written first is "24", as shown in FIG. 10, and that of data written second is "2A", as shown in FIG. 10.

Settings for the register in FIGS. 9 and 10 are a value (1st_hight) "3" of buffer height information (raster number), and a value "1 (presence)" of data presence/absence information (1_color_bit). The value of the register 813 (block width information: block_width) is "16". The registration adjustment value (1_reg_wnum) of the first color is "6", and the registration adjustment value (2_reg_wnum) of the second color is "3".

At this time, when the address at which information is stored in the register is incremented to right one by one, the actual address of the write pointer (WP) is counted up from 0→6→C→12→18→ . . . in FIG. 10.

The data write order may move to a stage lower by one every 16 data, as shown in FIGS. 9 and 10. Alternatively, the data write order may proceed by the block width (every 10 data) in accordance with the data reception order, and then move to a stage lower by one (move from position 10 to position 17 in FIG. 9).

As shown in FIG. 9, as for the printing data for the first color, up to 10 data are written (stored), and then the 11th data is written at the start of the next block (second block) in order to write (store) data which cannot be contained in the current block (first block) owing to execution of registration adjustment. Data stored at the start of the second block is the 11th data, which is calculated by 16−6+1=11 on the basis of the value "16" of the register 813 and the registration adjustment value "6" of the register 805. For this purpose, a counter which stores data is arranged, and when the counter indicates 10, the start address of the second block is designated.

In FIG. 9, the address at which the 11th printing data of the first color is stored is obtained by the number (2) of colors stored in the first block, the height (3) of each color, and the block width (16).

After write for registration adjustment ends (write of the 16th data ends in FIG. 9), the 17th data is written from the current block (first block). This means that the actual address is DE for the 16th data and 26 for the 17th data in FIG. 10.

In this way, write is alternately performed in the current block (first block) and next block (second block), and the printing data for the first color is written while registration adjustment is executed.

After all printing data for the first color is written, the same process is done subsequently from the second color of the first block.

The address at which information is stored in the register may be incremented one by one in the vertical direction to count up the actual address of the write pointer (WP) from 0→2→4→6→8→ . . . , as shown in FIG. 6A.

In FIG. 9, the reason that the address at which information is stored in the register is not incremented one by one in the vertical direction is to flexibly cope with a change in data from an image conversion block 3 or data from a host.

For example, when the image conversion block 3 is not used, the address at which information is stored in the register is incremented one by one for printing data from the host, and the write pointer (WP) is counted from 1→2→3→4→5→ . . . , as shown in FIG. 6A, similar to the prior art.

However, if HV conversion or the like is done using the image conversion block 3, the write pointer (WP) cannot be counted up from 1→2→3→4→5→ . . . by incrementing, one by one for printing data having undergone HV conversion, the address at which information is stored in the register, unlike FIG. 6A.

From this, by imparting a degree of freedom to the address increment amount, the address can cope with various data transfer methods from the host, and can also cope with data conversion in the image conversion block 3.

Figure 11A:
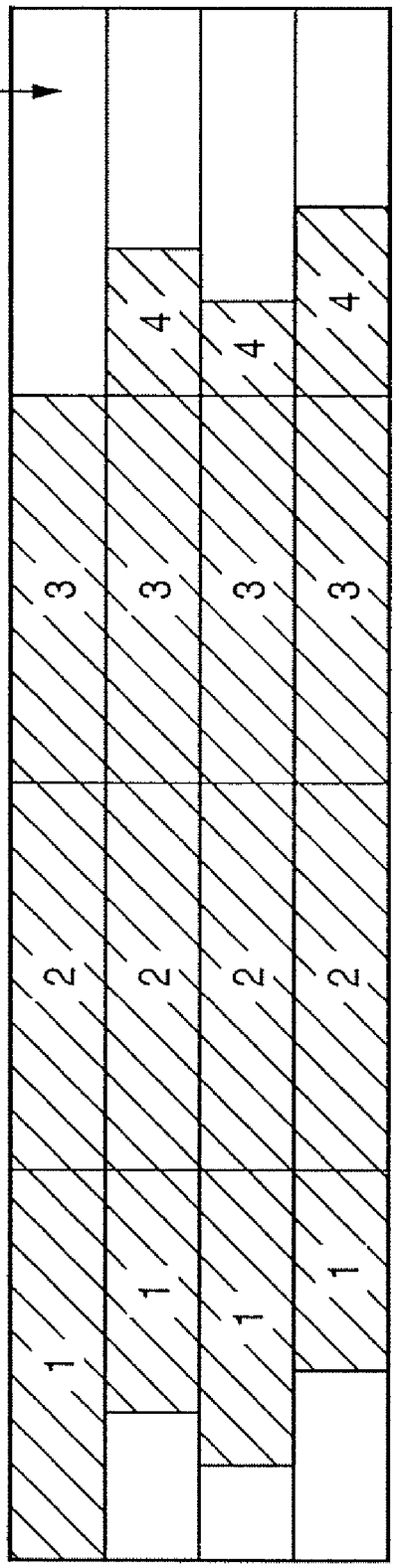
FIGS. 11A to 11C are views schematically showing a data state associated with registration adjustment.
Figure 11B:
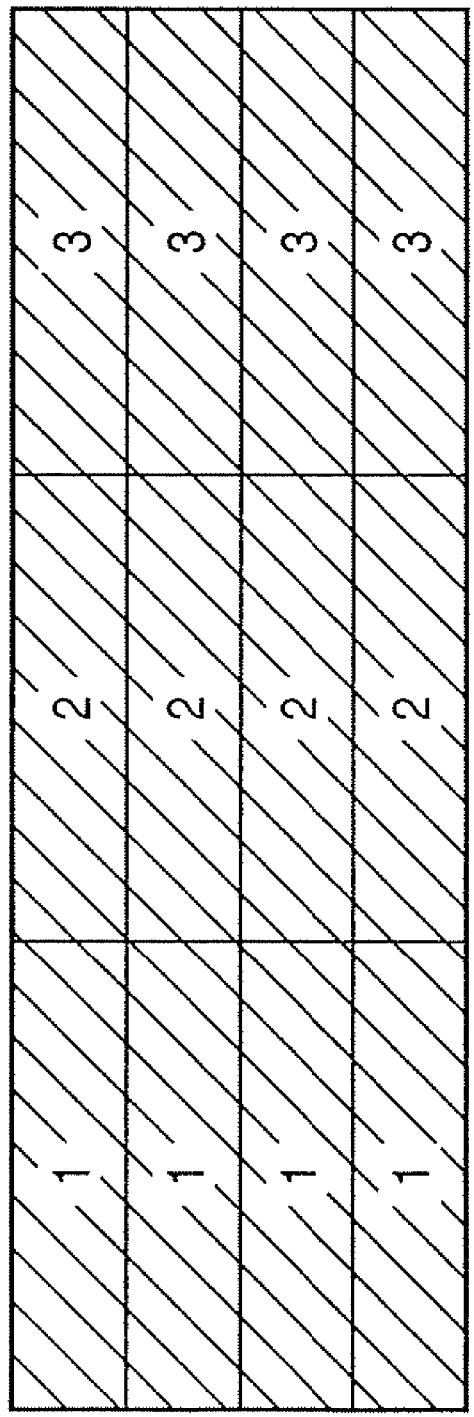
Figure 11C:
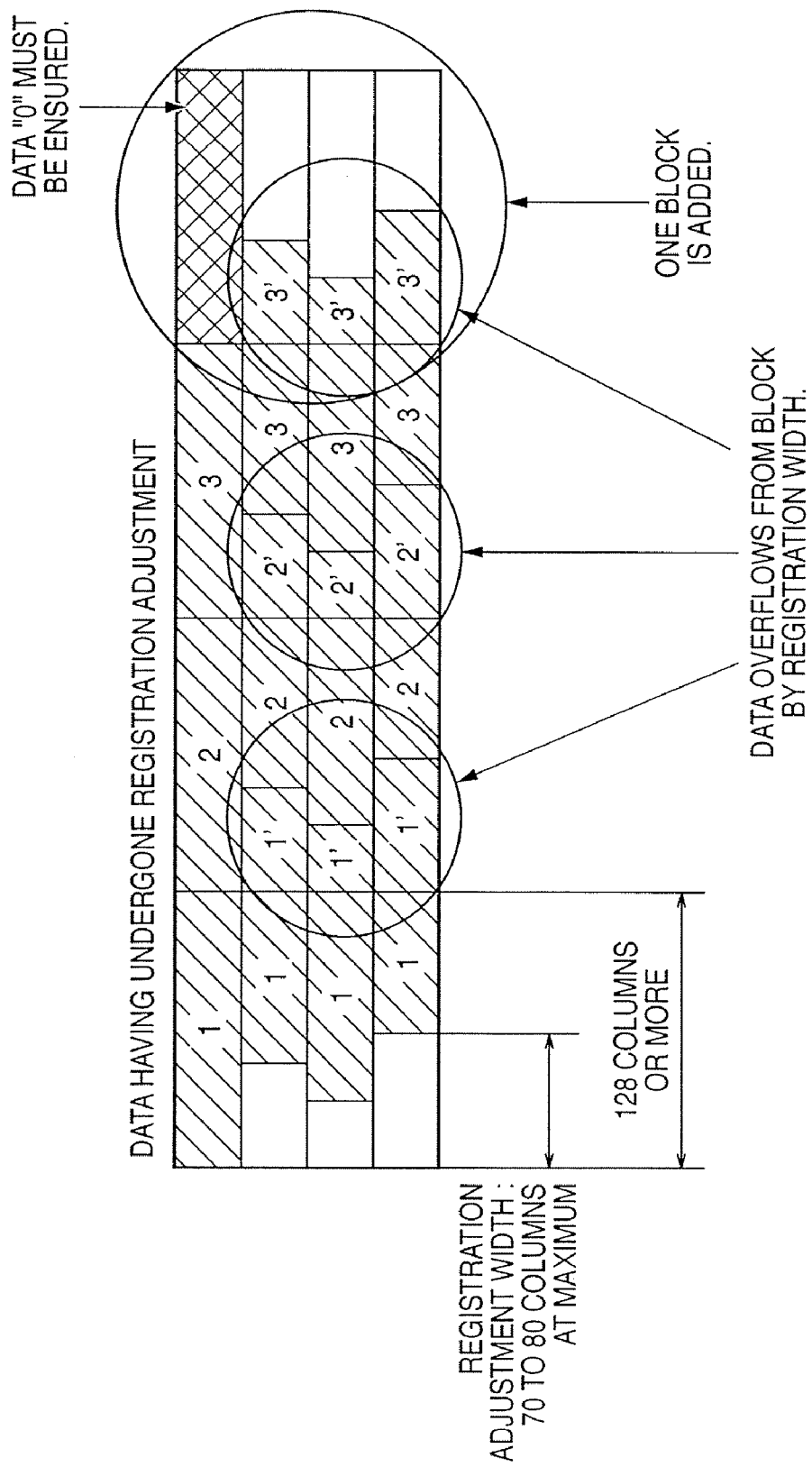

FIGS. 11A to 11C are views schematically showing a data state associated with registration adjustment. Numerics in FIGS. 11A to 11C represent block numbers. FIG. 11A shows transfer data when registration adjustment is completely done in a host computer (printer driver), like the prior art. FIG. 11B shows data which is transmitted from the host computer and received by the printing apparatus in the embodiment. This data does not undergo registration adjustment. FIG. 11C shows a state in which data as shown in FIG. 11B undergoes registration adjustment on the printing apparatus side and is stored in the printing buffer 4 of the printing apparatus (inkjet printing apparatus).

When data shown in FIGS. 11A and 11C are printed on printing media, the same printing results can be attained because both the data undergo registration adjustment. However, data in FIG. 11C results from registration adjustment executed for received data in FIG. 11B on the printing apparatus side. Owing to the registration adjustment data, the storage position of printing data shifts in the raster direction (right-and-left direction in FIGS. 11A to 11C), and the number of blocks increases by one from that of data in FIG. 11B.

If the number of blocks transmitted from the host computer becomes different from the number of blocks written in the printing buffer of the printing apparatus, a logical conflict occurs because information on the printing width (in the scanning direction) is output from the host computer to the printing apparatus on the basis of the number of blocks transmitted from the host computer. The printing apparatus executes printing operation on the basis of this information, and does not print by an amount changed in the number of blocks. For example, when the host computer outputs printing data of three blocks to the printing apparatus, and the printing apparatus performs registration adjustment and stores printing data in four blocks, only three blocks are printed, and one block is not printed.

To prevent this conflict, according to the embodiment, data as shown in FIG. 11B is transferred together with data of one extra block from the host computer to the printing apparatus so that the numbers of blocks in the host computer and printing apparatus (printing buffer) coincide with each other.

Figure 12A:
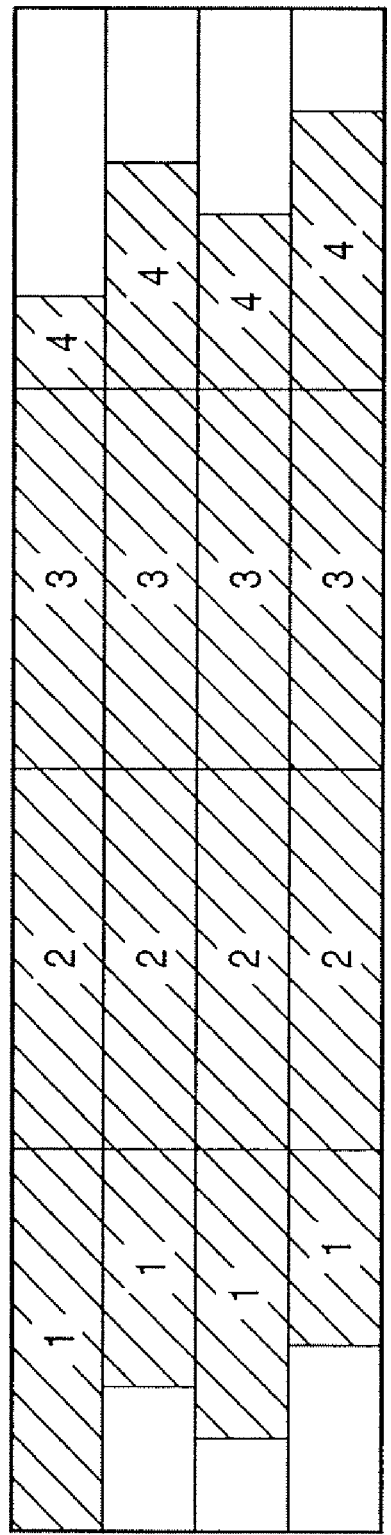

FIGS. 12A to 12C are views showing a data state associated with registration adjustment in the embodiment, similar to FIGS. 11A to 11C. FIG. 12A shows transfer data when registration adjustment is completely done in the host computer (printer driver), like the prior art. The transfer data has the same structure as that in FIG. 11A. FIG. 12B shows data which is transmitted from the host computer and received by the printing apparatus in the embodiment. However, this data does not undergo registration adjustment. FIG. 12C shows a state in which data as shown in FIG. 12B undergoes registration adjustment on the printing apparatus side and is stored in the printing buffer.

Data shown in FIGS. 11B and 11C and data shown in FIGS. 12B and 12C will be compared. The number of blocks of data in FIG. 11C obtained by performing registration adjustment for received data in FIG. 11B increases by one. To the contrary, the number of blocks of data in FIG. 12C obtained by performing registration adjustment for received data in FIG. 12B does not increase. That is, in transferring data as shown in FIG. 12B from the host computer, one extra block need not be transmitted.

Transfer of one extra block will be explained in more detail with reference to FIGS. 11B and 11C. FIGS. 13A to 13D are views showing a data structure when one extra block is transferred. In this case, the relationship between the size of one block (block size in the scanning direction), the data amount of the final block of transferred printing data (in FIGS. 11B and 11C, the data size of the third block in the scanning direction, and in FIGS. 12B and 12C, the data size of the fourth block in the scanning direction), and the registration adjustment amount (e.g., the value of each column) should be noted.

For example, for the block size in the scanning direction<the data size in the scanning direction + the registration adjustment amount, the number of blocks must be increased by one, as shown in FIG. 11C.

To the contrary, for the block size in the scanning direction>the data size in the scanning direction + the registration adjustment amount, the number of blocks need not be increased, as shown in FIG. 12C.

In this manner, the host computer determines whether the sum of the data size in the scanning direction and the registration adjustment amount becomes larger than the block size in the scanning direction, and performs a process of increasing the number of blocks in accordance with the determination result.

Figure 14:
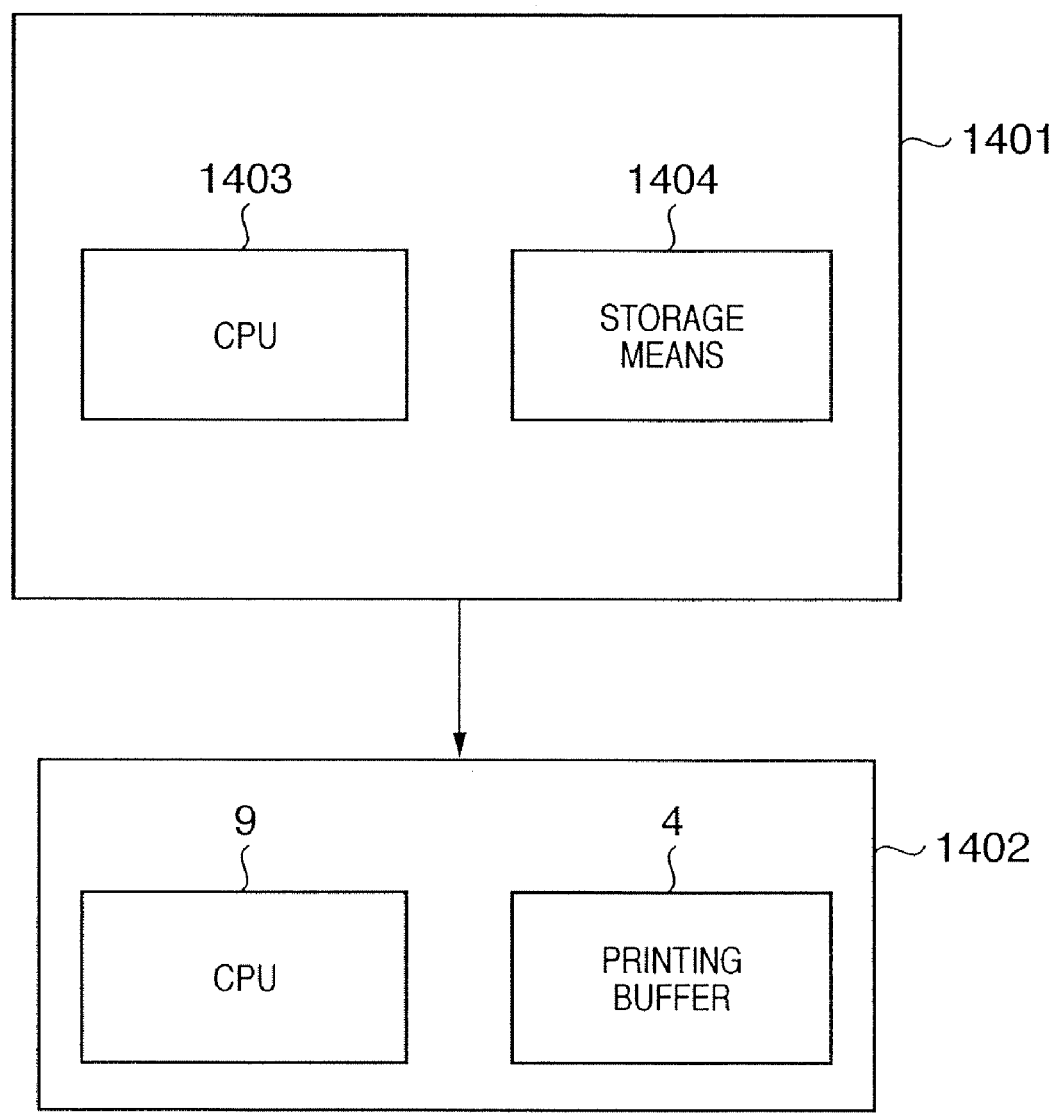
FIG. 14 is a block diagram showing the schematic control configuration of a host computer and printing apparatus according to the present invention.

FIG. 14 is a block diagram showing the schematic control configuration of a host computer 1401 and printing apparatus 1402.

Printing data is transferred from the host computer 1401 to the printing apparatus 1402 via an interface 1405.

An example of a process performed in the host computer 1401 will be described. A printer driver which generates printing data is executed by a CPU 1403. Printing data are generated for respective blocks, compressed by a predetermined compression method, and output to the printing apparatus 1402.

A storage means 1404 is used to temporarily store generated printing data or compressed data. The storage means 1404 comprises a counter which holds the number of blocks (data amount) of generated printing data.

As described above, the CPU 1403 determines whether the sum of the data size in the scanning direction and the registration adjustment amount becomes larger than the block size in the scanning direction, and performs a process of increasing the number of blocks in accordance with the determination result. For this purpose, the CPU 1403 acquires in advance, from the printing apparatus, information on the block size in the scanning direction and the registration adjustment amount.

Figure 15:
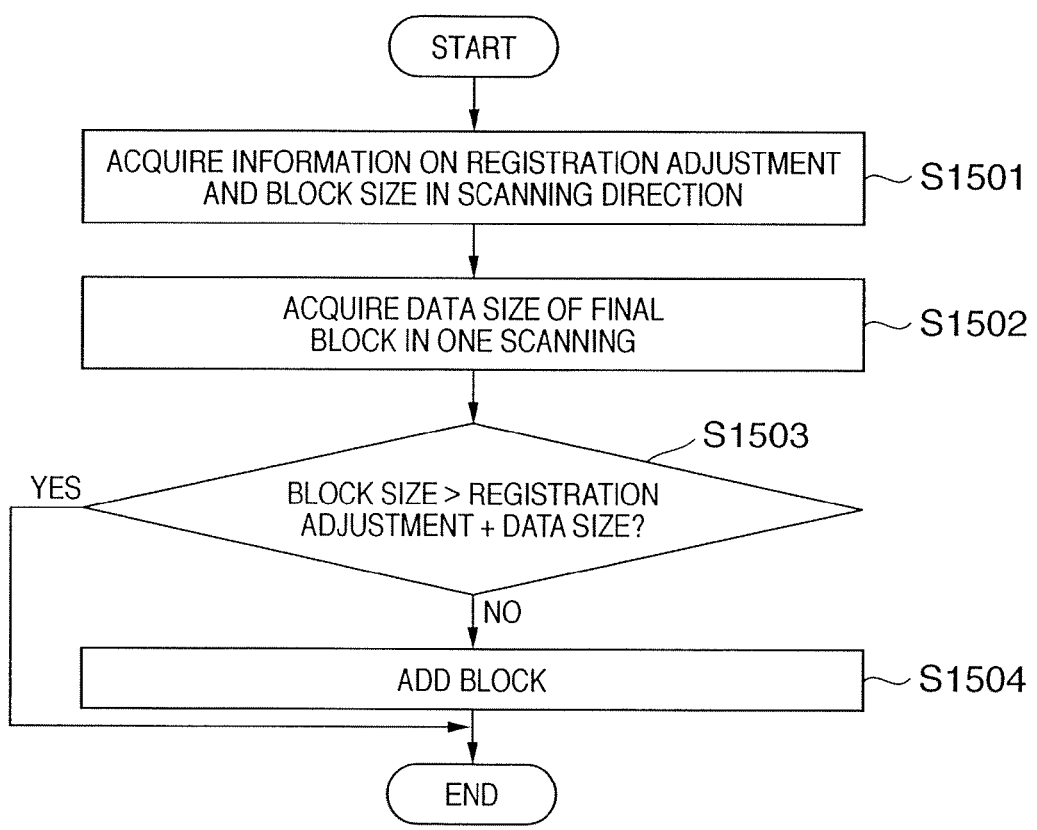
FIG. 15 is a flowchart showing a block addition process.
Figure 16:
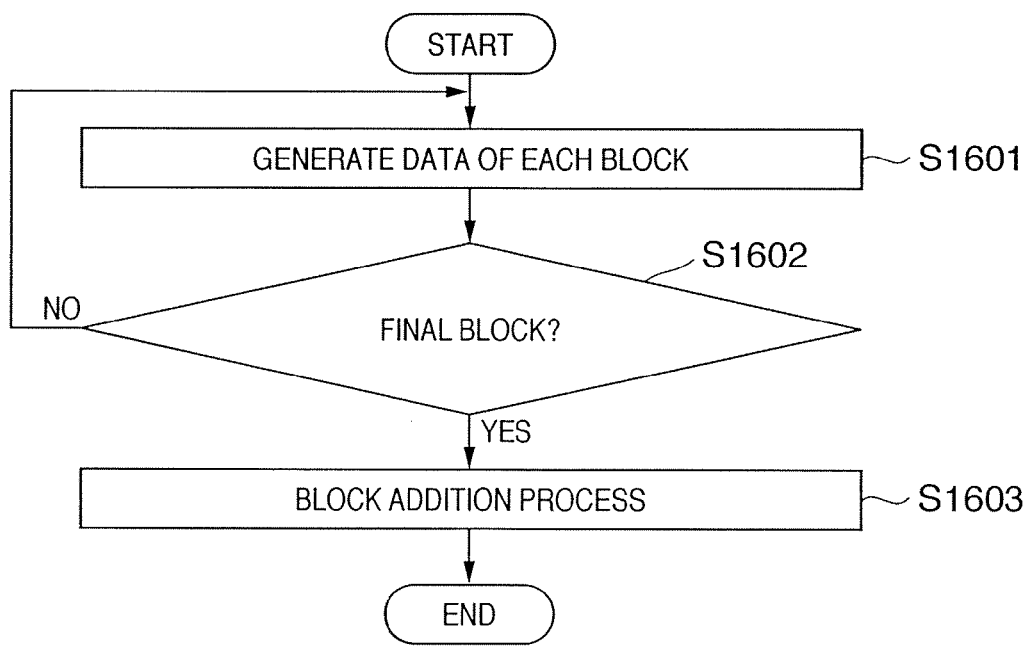
FIG. 16 is a flowchart showing a data generation process.

FIG. 16 is a flowchart showing a data generation process. In step S1601, data is generated for each block. Every time data of each block is generated, the number of generated blocks is counted. In step S1602, whether the current block is the final block (most downstream block in the scanning direction of the printhead) is determined. If YES in step S1602, a block addition process is done in step S1603. The block addition process will be explained with reference to FIG. 15. The process shown in FIG. 16 is performed every scanning because the data amount in the scanning direction changes every scanning.

By acquiring in advance information on the printing width of one scanning, the number of generated blocks to be printed is obtained and used as the threshold of determination in step S1602.

This process will be described in detail with reference to the flowchart of FIG. 15. In step S1501, information on the registration adjustment amount and information on the block size (in the main scanning direction) are acquired. In step S1502, the data size stored in the final block (data size in the scanning direction) is acquired. In step S1503, the sum of the data size (in the scanning direction) for the final block and the information on the registration adjustment amount is compared with the block size in the scanning direction. Note that the data size, the information on the registration adjustment amount, and the block size are given by, e.g., the number of columns.

If the block size in the scanning direction is smaller in step S1503 (NO), one block is added in step S1504; if the block size in the scanning direction is larger (YES), the process ends.

This determination is executed for printing data corresponding to each color. This is because the block size in the scanning direction is equal between respective colors, but the registration adjustment amount and the data size of the final block in the scanning direction may be different between respective colors. If a block need to be added for even one color, blocks are added for the remaining colors.

A color change code added to each block data will be explained. As described with reference to FIG. 3B, a color change code is inserted in each block in order to determine the break of printing data.

As shown in FIG. 3B, information for one color is formed from compression TAGs and compressed data. A color change code is added after these data.

If a block is to be added in step S1504, not compression TAGs or compressed data, but only color change codes (232, 233, and 239) are added subsequently to a final block (nth block data) 231. In this case, the number of colors is eight, and eight color change codes are added. FIG. 3C is a view showing a state after the nth block data upon reception of these codes.

Since only the color change codes are added, the printing apparatus can recognize (determine) an instruction to perform a process of adding a block and storing printing data because printing data cannot be contained in the block due to registration adjustment. The printing apparatus therefore stores the printing data in the printing buffer on the basis of the registration adjustment amount.

As another example of adding a block, as shown in FIG. 3D, it is also possible to contain only 1-byte null data (242, 244, . . . , 255) for respective colors and add color change codes (243, 245, . . . , 256) to the null data. Since blocks are formed from only 1-byte null data without containing any compression TAG, the printing apparatus can easily recognize an instruction to add a block.

Alternatively, a command 262 representing an instruction to add a block may be added after the final block data (nth block) 261, as shown in FIG. 3E.

Figures 13A, 13B, 13C, 13D:
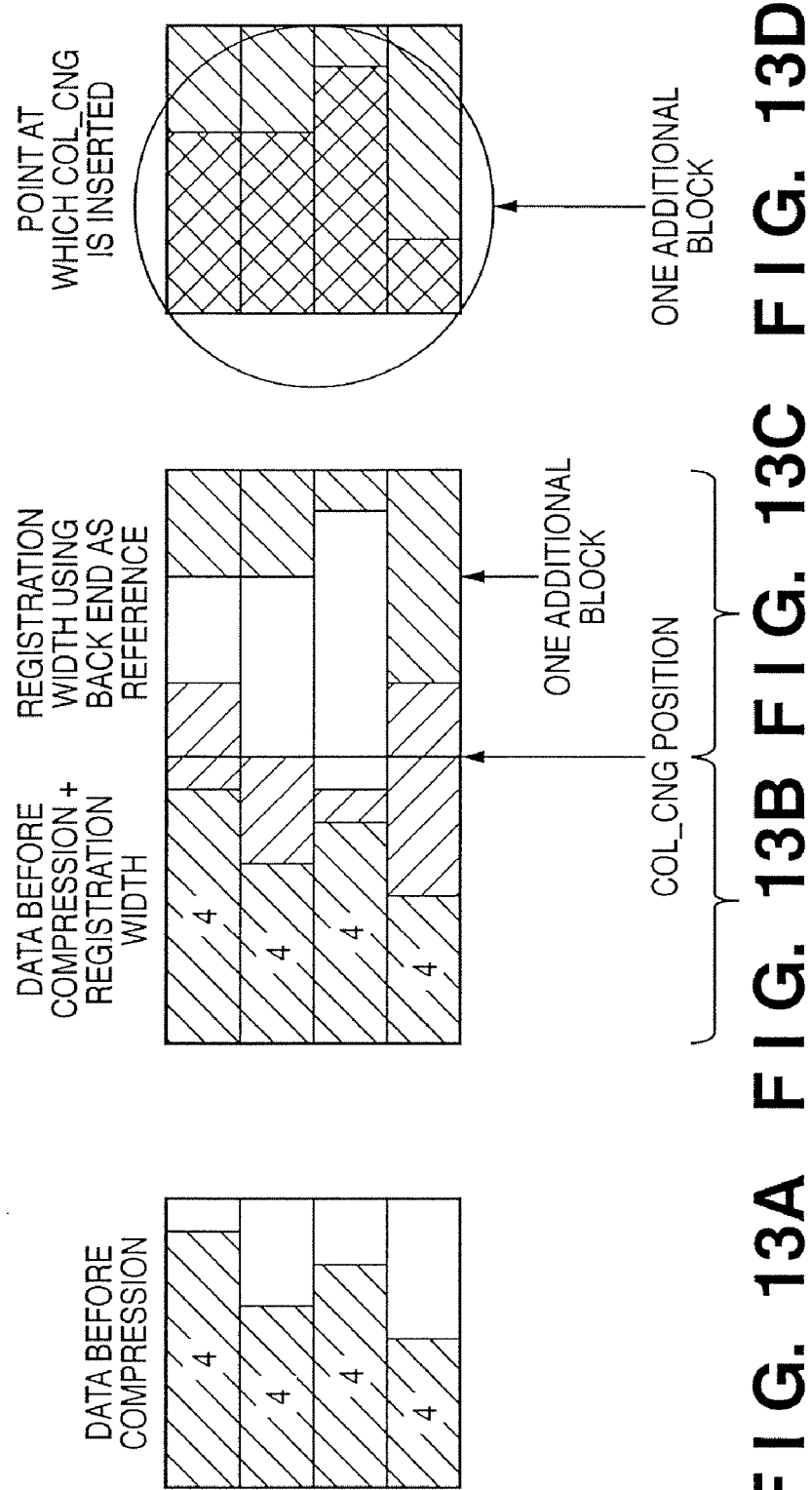

A printing data storage process in the host computer when adding a block as described above will be complementarily explained. FIG. 13A shows data before compression, FIG. 13B shows a state in which a registration adjustment width is added to the data before compression, FIG. 13C shows a registration adjustment width using as a reference the back end of an added block, and FIG. 13D shows a position at which the final printing data is to be stored. The block in FIG. 13B is the nth block, and the block in FIG. 13C is the (n+1)th block.

In this case, the final printing data must be positioned in the cross-hatched region of FIG. 13D. In the description using FIG. 3D, this position corresponds to the cross-hatched region. This is because if the final printing data is stored in the hatched region of FIG. 13D, one more block is added by registration adjustment.

As for FIGS. 13E to 13H, similar to FIGS. 13A to 13D, FIG. 13E shows data before compression, FIG. 13F shows a state in which a registration adjustment width is added to the data before compression, FIG. 13G shows a registration adjustment width using the back end of an added block as a reference, and FIG. 13H shows a position at which a color change code is to be inserted. The data structure in FIGS. 13E to 13H is different from that in FIGS. 13A to 13D in that no extra block is transferred.

Also in this case, if the final printing data is stored in a region other than the cross-hatched region of FIG. 13H, one more block is added by registration adjustment. To prevent this, as shown in FIG. 13H, the color change code must be positioned before the boundary of the registration adjustment width using the back end shown in FIG. 13G as a reference.

Storage of printing data when no registration adjustment need be performed will be explained with reference to FIGS. 7A and 7B.

FIG. 7A is a view showing an example of printing data which is written in the printing buffer and corresponds to one scanning. In the example shown in FIG. 7A, no image data exists in an area corresponding to the fourth block, and the fourth block is not ensured in the printing buffer.

In FIG. 7A, the printing data for the third and fourth colors do not exist in data stored in the second block, and the printing data for fifth to eighth colors are stored by omitting areas for the third and fourth color. The third block stores only the printing data for the first and second colors, and does not store the printing data for the third and subsequent colors. The hatched portions of the second and third blocks mean that no data exists and no buffer is assigned. Hence, an address next to the final address of the printing data for the eighth color in the second block is the start address of the printing data for the first color in the third block. In this fashion, if no registration adjustment need to be performed, image data can be stored adjacent to each other in the printing buffer, and the printing buffer can be efficiently used.

For example, when the area of the printing buffer is uniquely ensured even for an area having no printing data, and areas for storing all data of one scanning cannot be ensured in the printing buffer, data of one scanning can be stored by controlling storage of data on the basis of presence/absence information of the printing data for each color which is stored in the register in correspondence with the presence/absence of image data.

<Read of Data from Printing Buffer>

A process of reading out data from the printing buffer will be explained with reference to FIG. 8. In FIG. 8, the left side illustrates the read address controller 8A of the printing buffering structure control circuit 8, and the right side illustrates the printing buffer 4.

The buffer area of the printing buffer 4 is defined by the start address top_adr and final address bottom_adr of the printing buffer. The start address is stored in the register 803, and the final address is stored in the register 804. Similar to FIG. 5, "RP" in the printing buffer represents a read pointer, and "WP" represents a write pointer. The hatched portion between the RP and the WP in the printing buffer 4 means that printing data is stored, and the remaining portion means that no printing data is stored.

The register 802 in the read address controller 8A represents a data read address (RP: Read Pointer), a block 900 surrounded by a broken frame represents the first register group, and a block 901 surrounded by a solid frame represents the second register group.

For example, at the start of scanning in printing printing data of the first to eighth blocks, information on the first block is stored in the first register group, and information on the second block is stored in the second register group. After printing of the first block ends, the information in the second register group 901 is copied and stored in the first register group 900, and information on the third block is stored in the second register group 901. The same process is sequentially done until data on the final eighth block is stored. At the start of the next scanning, information on the first block is stored in the first register group, and information on the second block is stored in the second register group.

If no information on the (n+1)th block is stored in the second register group at the end of printing of the nth block given by the first register group, no printing data on the (n+1)th block has been prepared. Thus, information in the second register group is not copied in the first register group, and data read from the printing buffer stops.

A register 819 in the first register group sets height information (1st_hight) and printing data presence/absence information (1_color_bit) for the first color. Registers 822, 824, 826, 828, 830, 832, and 834 similarly set pieces of height information and pieces of data presence/absence information for the second to eighth colors.

Reference numeral 820 denotes a register which stores width information (block_width) of each block data. The width information is a value commonly used for each block from the first to eighth colors.

A register 818 stores the read address (1st_color_adr) of the first color. The address is updated upon read from a printing buffer 819 which stores the printing data for the first color. For example, as shown in FIG. 9, printing data of one column in the first color area is read out from 1→2→3→4. Registers 821, 823, 825, 827, 829, 831, and 833 store the read addresses of the second to eighth colors, respectively. The printing data for second to eighth colors are also sequentially read out by data of one column, similar to that of the first color.

Data stored in the printing buffer 4 includes printing data for a plurality of color. When printing data for the first color, second color, . . . coexist, addresses for storing printing data of respective colors are not consecutive. If the number of read address registers is one, the address must be calculated in reading out the address of the printing buffer 4 for the second color subsequently to the address of the printing buffer 4 for the first color. By preparing, in the printing buffer 4, registers for storing read addresses for respective colors, address calculation in read for each column can be omitted.

The register 817 is an address control register. When the printing data generation block 5 requests a read address via the data read request signal line S805 for each color, the address control register 817 increments the read address by one, and outputs the resultant read address to the printing buffer 4 via the signal line S806.

Reference numeral 835 denotes a register which stores the address of the next block. If the current read block is the first block, the register stores the start address of the second block. The value of this register is copied in the register 802 after the end of reading out the current block data. As a result, the next block data can be smoothly read out.

A register 836 is a table for storing information for specifying the read order of the first to eighth colors. A value set in this table allows freely setting an order of reading out data from the printing buffer. For example, data can be read out in an order of the first color→the second color→ . . . →the eighth color. By changing the value, read of the third and fourth color can be skipped, like the first color →the second color→the fifth color→the sixth color→the seventh color→the eighth color. In this fashion, read of printing data which is not stored can be reliably skipped.

The second register group 901 is a set of buffers which store information on the next block data. After the registers of the first register group are read, values set in the registers of the second register group are set in corresponding registers of the first register group. For example, a value set in a register 838 is set in the register 819. Registers 839 to 845 set pieces of similar information for the second to eighth colors.

The register 838 (819) stores buffer height information of the printing data for the first color, and information representing the presence/absence of the printing data for the first color.

Reference numeral 846 (820) is a register which sets block width information. The width information is a value commonly used for each block from the first to eighth colors.

A register 878 stores information (same_type) representing whether the block size is equal to the previously set block size. When the block sizes are equal to each other, the value is set to "1", and the same value can be easily set again in the first register group. In this case, the settings of the registers 838 to 846 can be omitted. When the value of the register 878 is "0", values are set in the registers 838 to 846.

As described above, according to the preferred embodiment, an inkjet printing apparatus is given a function of performing registration adjustment in the printhead scanning direction. Generation of printing data in a host computer can be speeded up, and a time until the printing apparatus executes printing upon designation of printing by the host computer can be shortened.

<Modification>

In the above embodiment, respective color blocks have the same width. However, different widths may be set for respective blocks.

FIG. 7B is a view for explaining a case in which the memory is used more effectively than in FIG. 7A in the above embodiment. In FIG. 7A, width information in the scanning direction is equal between blocks prepared by dividing a printing region. When, however, a block does not hold any image data to be printed, it suffices to have minimum width information. For example, assuming that the data amounts of the third and fifth blocks are smaller than those of the remaining blocks in FIG. 7A, the widths of the third and fifth blocks can be shortened in accordance with the printing data amount.

In the modification, the width is controlled using a full-width block and half-width block. The half-width block uses a color change code as a break, whereas the full-size block, which has a predetermined length, does not use any color change code. If no color change code appears even after the half block size in writing (transferring) data from the reception buffer to the printing buffer, the current block is recognized as a full-width block. In the modification, the widths of the third and fifth blocks are set to half the widths of the remaining blocks.

This realizes efficient use of the printing buffer even with a small memory capacity. For example, even when the printing buffer cannot ensure an area for storing all data of one scanning, data of one scanning can be stored.

In this case, when printing data is formed from null data over a plurality of blocks, the host apparatus generates printing data so as to change the block width.

<Other Embodiment>

The above embodiment has exemplified an application of the present invention to an inkjet printing apparatus which prints in accordance with the inkjet method. However, the present invention can also be applied to a printing apparatus of another type as far as the printing apparatus prints by scanning, in a direction crossing to a printing element array direction, a printhead having an array of printing elements.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy. According to this ink-jet printer and printing method, a high-density, high-precision printing operation can be attained.

As the typical arrangement and principle of the ink-jet printing system, those practiced by use of the basic principle disclosed in, for example, U.S. Pat. Nos. 4,723,129 and 4,740,796 is preferable. The above system is applicable to either one of so-called on-demand type and continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

Furthermore, as a full line type printhead having a length corresponding to the width of a maximum printing medium which can be printed by the printer, either the arrangement which satisfies the full-line length by combining a plurality of printheads as disclosed in the above specification, or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

Still further, the printing apparatus according to the present invention can be a form of an incorporated device or an additional device as an image output terminal of an information processing device, a copying machine with a reader or a facsimile machine which has transmission/reception function.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application Nos. 2003-413815 filed on Dec. 11, 2003 and 2004-341685 filed on Nov. 26, 2004 which are hereby incorporated by reference.

What is claimed is:

1. A host apparatus having generation means for generating, for each block corresponding to each of a plurality of regions prepared by dividing in a scanning direction a scanning printing region of a printhead on a printing medium, printing data to be output to a printing apparatus which prints on the printing medium by scanning on the printing medium the printhead having a plurality of printing element arrays, and output means for outputting an instruction including the printing data, comprising:

shift amount acquisition means for acquiring information on a shift amount for the printing element array of the printhead;

block count acquisition means for acquiring, from the generated printing data, the number of blocks corresponding to printing data to be printed by one scanning printing in the printing apparatus;

determination means for determining on the basis of the information on the shift amount whether to change the number of blocks acquired by said block count acquisition means; and change means for changing a content of the instruction when said determination means determines to change the number of blocks.

2. The apparatus according to claim 1, wherein said determination means compares information on a size of one block in the scanning direction with a sum of the information on the shift amount and a data size of data in the scanning direction that corresponds to a most downstream block in the scanning direction in the printing data to be printed by one scanning printing.

3. The apparatus according to claim 1, wherein said change means increases the number of blocks.

4. The apparatus according to claim 1, further comprising instruction content change means for adding, to the instruction, information representing that said determination means changes the number of blocks.

5. The apparatus according to claim 4, wherein said instruction content change means adds, subsequently to data corresponding to data corresponding to a most downstream block, at least one of a predetermined number of data and a command to change the number of blocks.

* * * * *